US009146925B2

(12) United States Patent
Tijerino

(10) Patent No.: US 9,146,925 B2
(45) Date of Patent: Sep. 29, 2015

(54) USER DEFINED INTERNET JUKEBOX KIOSKS SET TOP BOX

(76) Inventor: Manuel Ignacio Tijerino, Slidell, LA (US)

( * ) Notice: Subject to any disclaimer, the term of this patent is extended or adjusted under 35 U.S.C. 154(b) by 0 days.

(21) Appl. No.: 12/804,665

(22) Filed: Jul. 27, 2010

(65) Prior Publication Data

US 2011/0029417 A1 Feb. 3, 2011

(51) Int. Cl.
| | |
|---|---|
| *G06F 17/30* | (2006.01) |
| *H04N 7/18* | (2006.01) |
| *H04N 21/222* | (2011.01) |
| *H04N 21/231* | (2011.01) |
| *H04N 21/2543* | (2011.01) |
| *H04N 21/2743* | (2011.01) |
| *H04N 21/414* | (2011.01) |
| *H04N 21/81* | (2011.01) |
| *G06Q 40/00* | (2012.01) |

(52) U.S. Cl.
CPC .......... *G06F 17/30058* (2013.01); *G06Q 40/12* (2013.12); *H04N 7/18* (2013.01); *H04N 21/2223* (2013.01); *H04N 21/23109* (2013.01); *H04N 21/2543* (2013.01); *H04N 21/2743* (2013.01); *H04N 21/41415* (2013.01); *H04N 21/8113* (2013.01)

(58) Field of Classification Search
CPC ............. G06Q 30/00; H04L 29/06448; H04N 21/41415
USPC ......................................................... 709/219
See application file for complete search history.

(56) References Cited

U.S. PATENT DOCUMENTS

| | | | | | |
|---|---|---|---|---|---|
| 5,629,980 | A | * | 5/1997 | Stefik et al. | 705/54 |
| 5,926,624 | A | * | 7/1999 | Katz et al. | 709/217 |
| 6,009,401 | A | * | 12/1999 | Horstmann | 705/317 |
| 6,073,124 | A | * | 6/2000 | Krishnan et al. | 705/59 |
| 6,170,014 | B1 | * | 1/2001 | Darago et al. | 709/229 |
| 6,338,044 | B1 | * | 1/2002 | Cook et al. | 705/14.54 |
| 6,519,648 | B1 | * | 2/2003 | Eyal | 709/231 |
| 6,601,136 | B2 | * | 7/2003 | Gunaseelan et al. | 711/112 |
| 7,194,555 | B2 | * | 3/2007 | Scibora | 709/247 |
| 7,206,821 | B2 | * | 4/2007 | Moritomo | 709/217 |
| 7,577,717 | B2 | * | 8/2009 | Smith | 709/218 |
| 7,822,687 | B2 | * | 10/2010 | Brillon et al. | 705/59 |
| 7,848,531 | B1 | * | 12/2010 | Vickers et al. | 381/107 |
| 8,332,895 | B2 | * | 12/2012 | Nathan et al. | 725/61 |
| 8,548,960 | B2 | * | 10/2013 | Miyajima | 707/688 |
| 8,630,529 | B2 | * | 1/2014 | Fu et al. | 386/241 |
| 2003/0135424 | A1 | * | 7/2003 | Davis et al. | 705/26 |
| 2006/0031548 | A1 | * | 2/2006 | Funchess | 709/231 |
| 2006/0239131 | A1 | * | 10/2006 | Nathan et al. | 369/30.06 |

(Continued)

OTHER PUBLICATIONS

Nilsson, ID3 tag version 2.3.0, Informal Standard, Document id3v2. 3, Mar. 4, 1999.*

*Primary Examiner* — Jerry Dennison
(74) *Attorney, Agent, or Firm* — Christie, Parker & Hale, LLP

(57) ABSTRACT

A computer readable storage method and system allowing any artist to upload media, including images, video and music, to a server, have that media uploaded in a system of internet jukeboxes placed in establishments for instant playback of media by paying customers. The system of internet jukeboxes programmed to maintain an account for the artist allowing the artist to earn fees and royalties from playback of the media and to provide for automated payment of rent, and other fees due the establishment and the service provider.

17 Claims, 48 Drawing Sheets

(56) References Cited

U.S. PATENT DOCUMENTS

| | | | |
|---|---|---|---|
| 2008/0086379 A1* | 4/2008 | Dion et al. | 705/14 |
| 2009/0063437 A1* | 3/2009 | Hendrey et al. | 707/4 |
| 2010/0057734 A1* | 3/2010 | Miyajima | 707/6 |
| 2010/0272290 A1* | 10/2010 | Carroll | 381/107 |
| 2012/0069134 A1* | 3/2012 | Garcia et al. | 348/14.08 |
| 2012/0150614 A1* | 6/2012 | Dion et al. | 705/14.32 |
| 2012/0250893 A1* | 10/2012 | Carroll et al. | 381/107 |
| 2013/0318441 A1* | 11/2013 | Brillon et al. | 715/716 |
| 2014/0223492 A1* | 8/2014 | Nathan et al. | 725/61 |

* cited by examiner

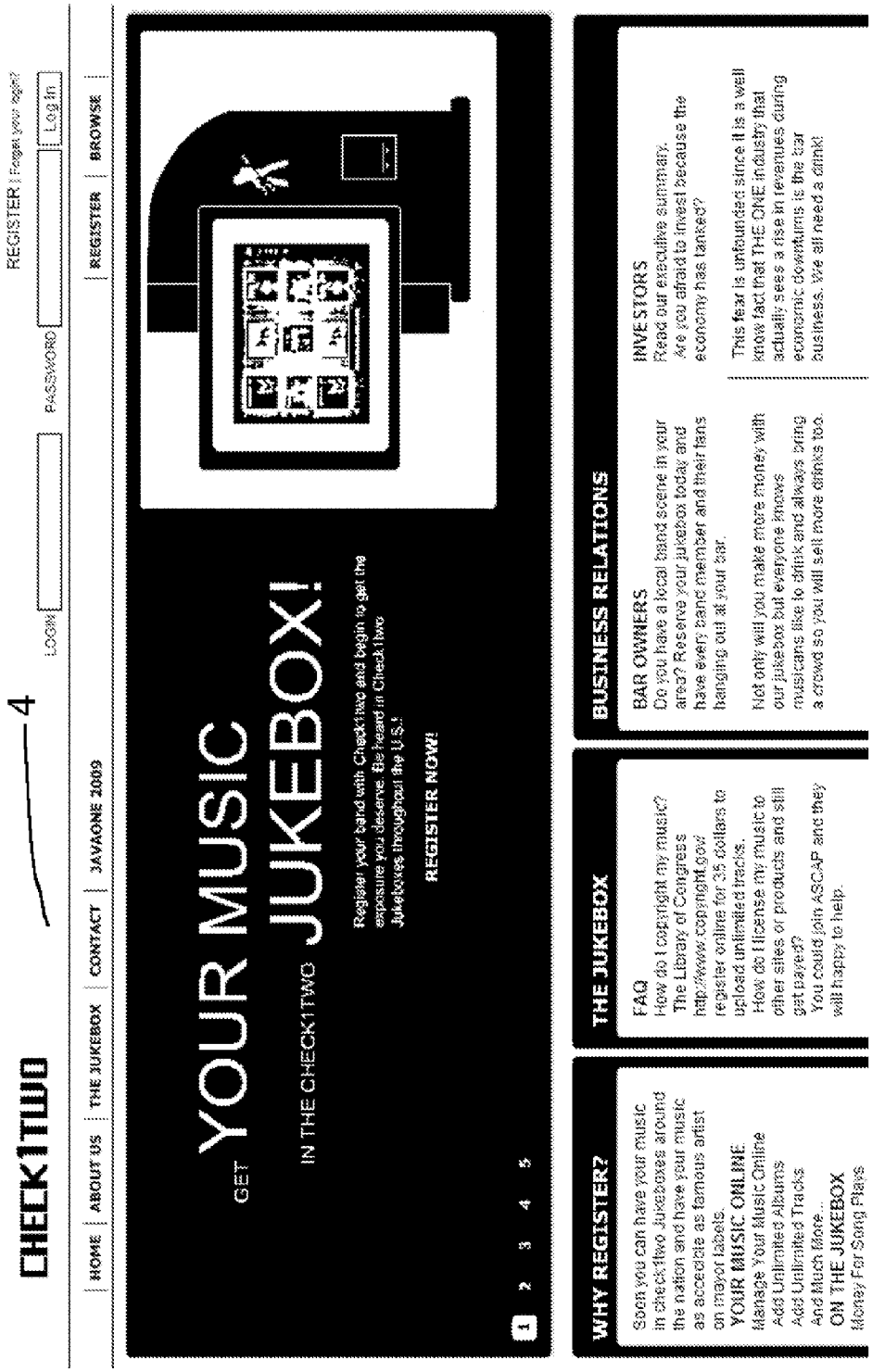
FIG. 2.1

CHECK1TWO

| HOME | ABOUT US | THE JUKEBOX | CONTACT | JAVAONE 2009 |

CHECKTWO® 1 YEAR MEMBERSHIP APPLICATION

LOGIN  REGISTER | Forgot your login?

PASSWORD  [Log in]

REGISTER    BROWSE

1. Info

We believe that musicians, composers, and publishers should make money, and do not allow you to upload music that you did not create. Not only would that be wrong but it is illegal. To help with that effort, we charge a very small fee to join. Your creditcard payment serves as your identification.

We currently use paypal to handle credit card processing. We do not hold any credit card information on our site, therefore we are pci compliant.

You can use a credit card, atm check card, or your paypal account. If your are using a creditcard on your paypal account is set up with a credit card, we will receive an instant payment notification from paypal as soon as your

2. Agreement

By subscribing I am agreeing to this agreement. I will not upload music that is not mine. I am aware that uploading someone elses' music to my check1two profile can put me at the risk of being sued by the rightful owner for copyright infringement. I assure that I am affiliated with the media that I add to check1two.com. I am allowing check1two inc to help me promote my music. I am the owner of my tracks and I will retain ownership of my tracks. I can add or delete my tracks from check1two at any time. check1two inc has the right to change this agreement at any time.

Subscribe

FIG. 2.2

CHECK1TWO

HOME | ABOUT US | THE JUKEBOX | CONTACT | JAVAONE 2009

CONTROL PANEL / WHAT OTHER PEOPLE SEE | REGISTER | BROWSE

CHECK1TWO® CREATE YOUR PROFILE — 6

*Use this to create your band profile. You will be able to make edits later.*

Artist Name
Artist or Band Name

Login Credentials
Email
Verify Email
Password ••••••••••
Confirm Password

Contact Number
Phone Number

Geographic Information

CHECK1TWO

| HOME | ABOUT US | THE JUKEBOX | CONTACT | JAVAONE 2009 |   | CONTROL PANEL / WHAT OTHER PEOPLE SEE |   | REGISTER | BROWSE |

8 —

Manuel Tijerino

EDIT YOUR INFORMATION

Edit Profile
Edit Pictures
Edit Music
Edit Albums

PERSONAL INFORMATION

Subscription Information

FEATURES UNDER DEVELOPMENT

Edit Coverart
View Earnings
Delete Profile

Ad goes here

LOCATION

Hometown : NEW ORLEANS, LA USA
Genre : METAL
Last Login : 2010-05-24
Last Update : 2010-09-29
Member Since : 2010-05-24

BIO

FIG. 3.1

CHECK1TWO

| HOME | ABOUT US | THE JUKEBOX | CONTACT | JAVAGME 2009 | | CONTROL PANEL / WHAT OTHER PEOPLE SEE | REGISTER | BROWSE |

CHECK1TWO® EDIT YOUR PROFILE

*Here you can change setting in your profile.*

Artist Name

Name : [ Manuel Tijerino ]

Login Credentials

Email : [ manueltijerino@gmail.com ]
Password : [ •••••••••••• ]

Contact Number

Number : [ 985-288-5534 ]

Geographic Information

City State : [ NEW ORLEANS, LA ]

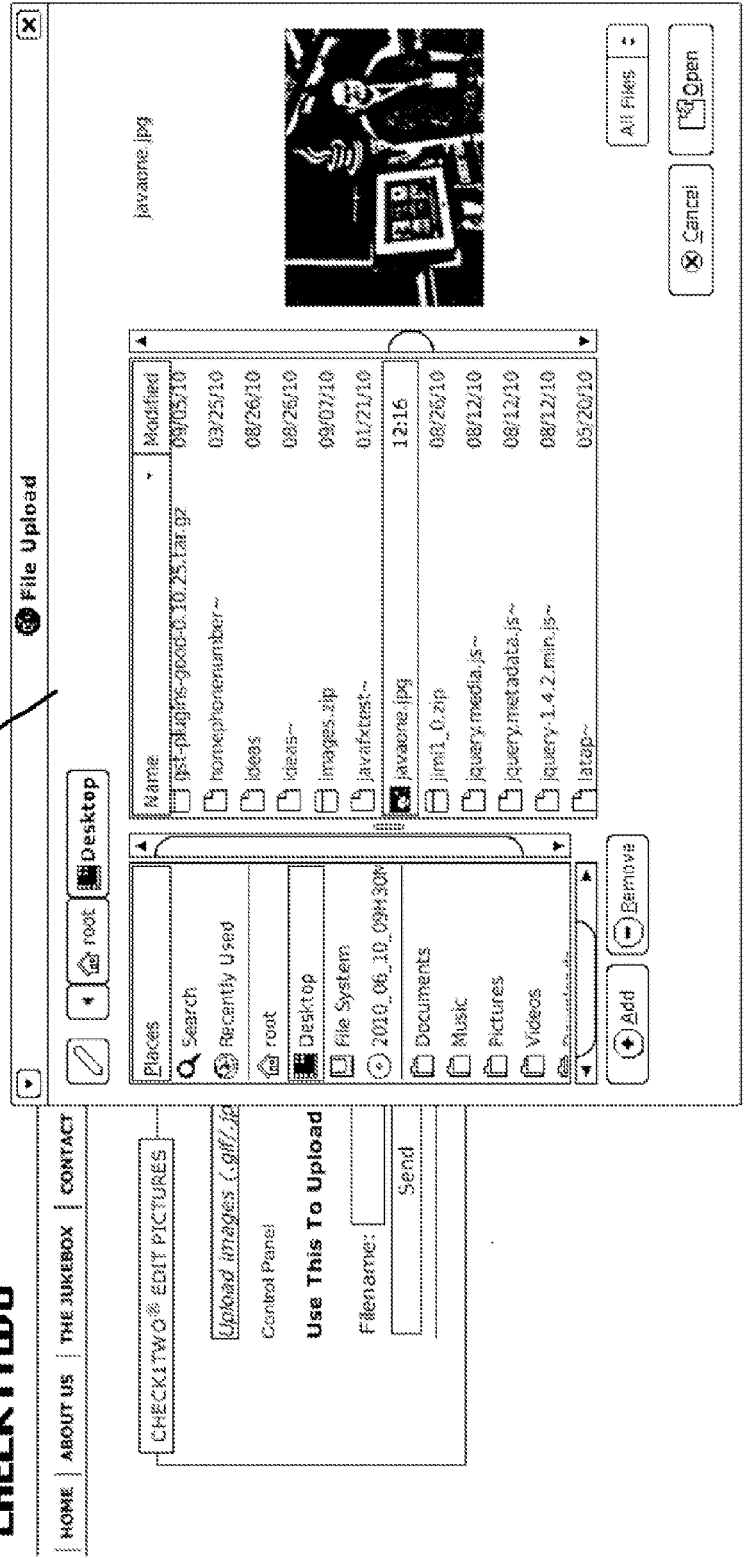
FIG. 3.5

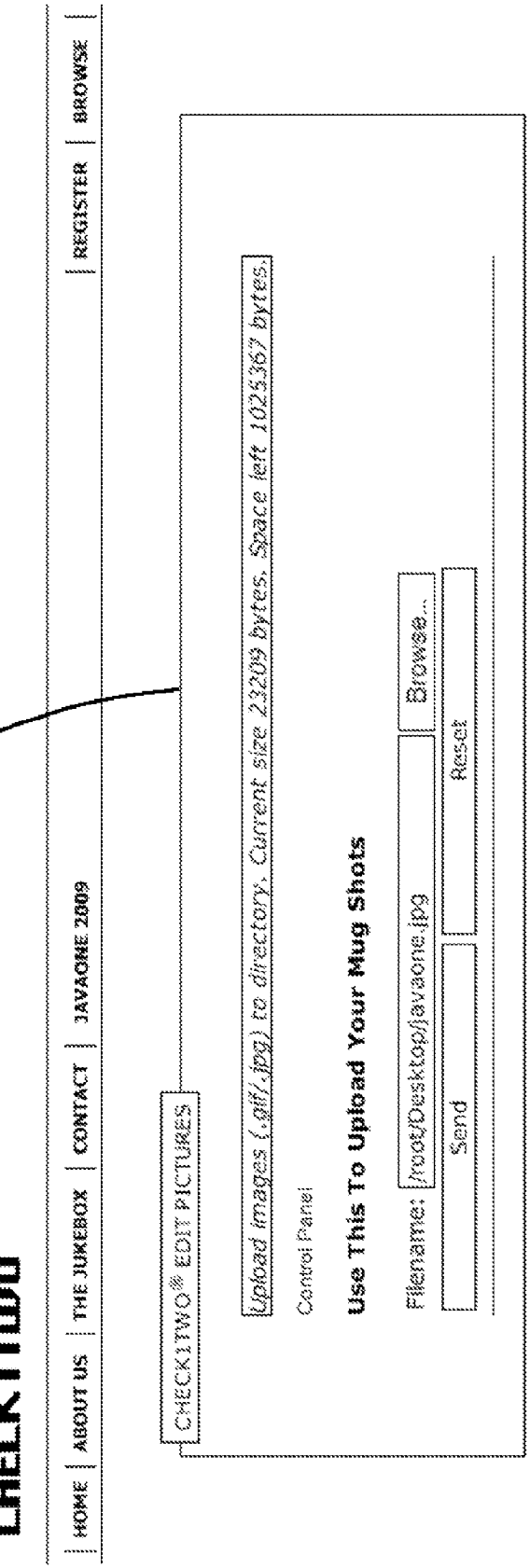
FIG. 3.6

FIG. 3.7

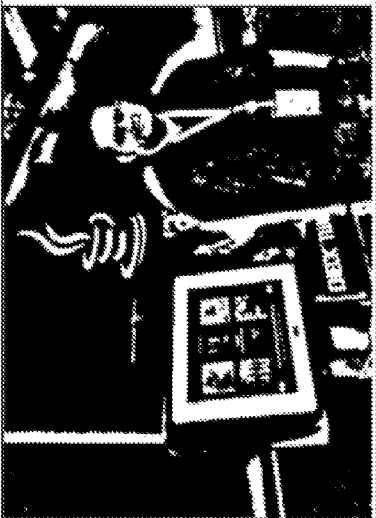
FIG. 3.8

FIG. 3.9

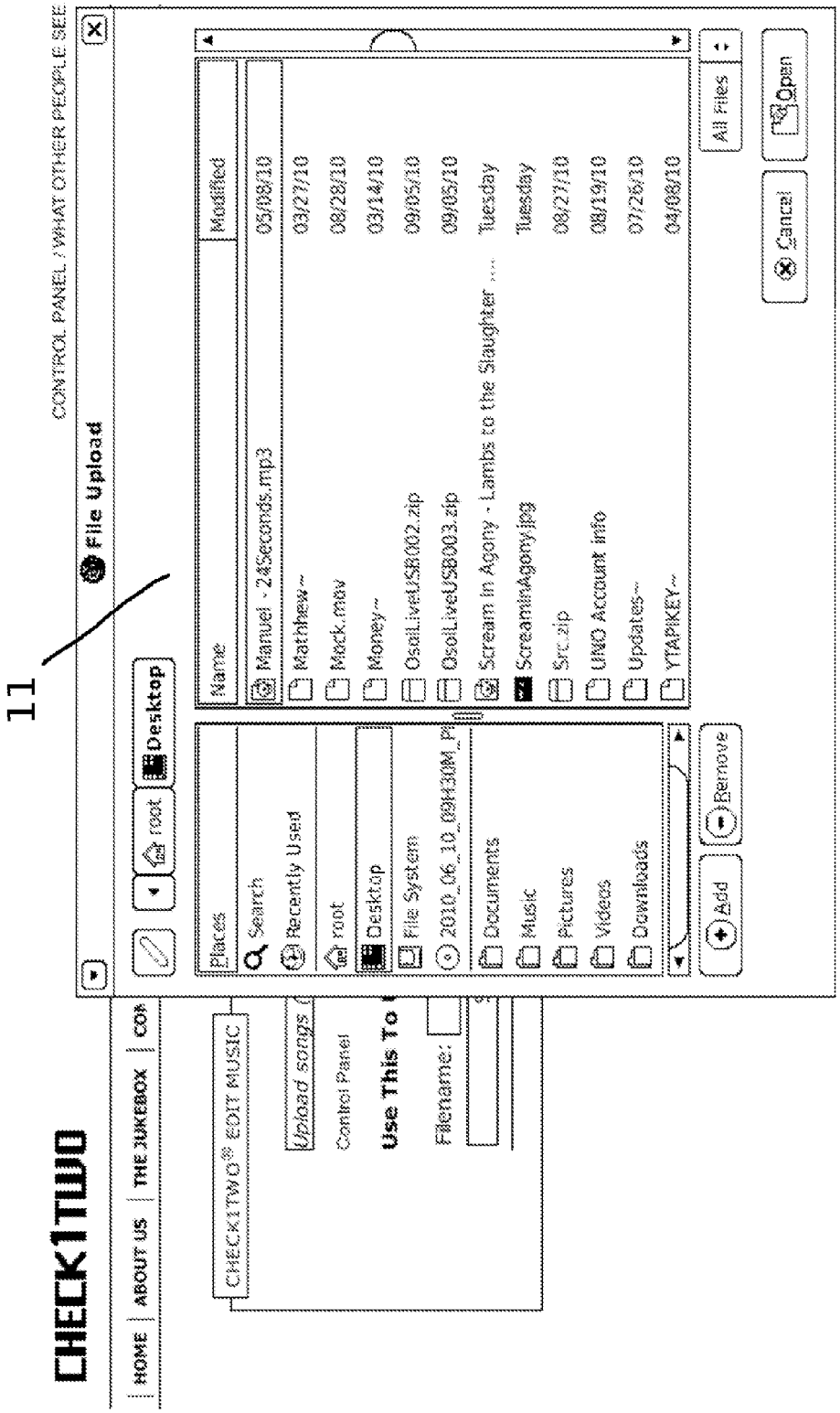
FIG. 3.10

FIG. 3.11

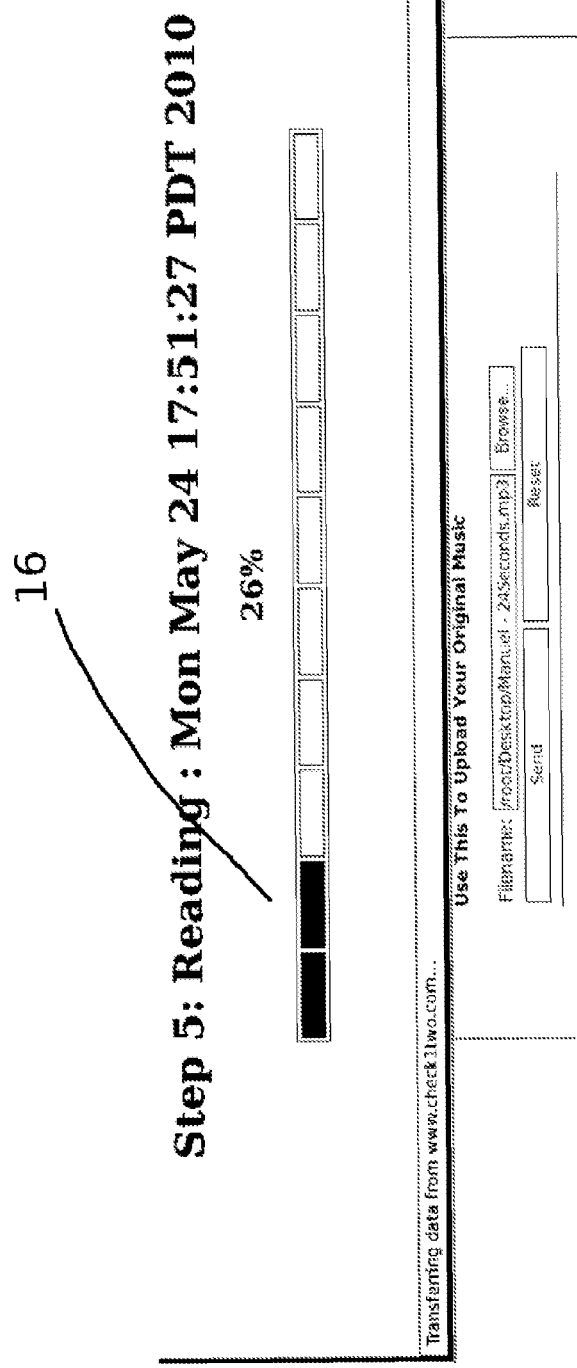
FIG. 3.12

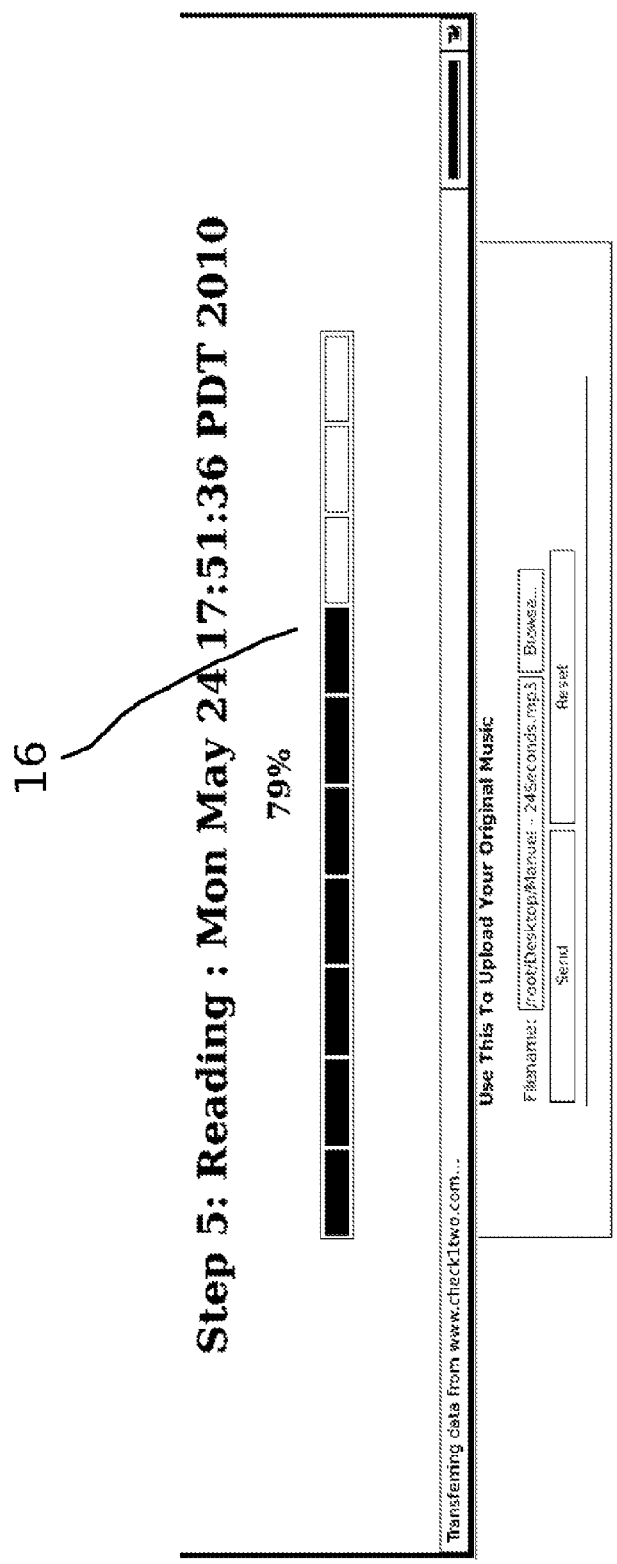
FIG. 3.13

FIG. 3.14

CHECK1TWO

HOME | ABOUT US | THE JUKEBOX | CONTACT | JAVAONE 2009

CONTROL PANEL / WHAT OTHER PEOPLE SEE

REGISTER | BROWSE

CHECK1TWO® EDIT ALBUMS

— 18

*Use this page to create albums from your tracks*

Available Tracks 1

| Sort Track | Track Title | Add To Album |
|---|---|---|
| Up | Down | Manuel - 24Seconds.mp3 | Add To Selected Album |

Create A New Album

Album Name    Number Of Disks

[ ]    [ 1 ▼ ]

[ Create Album ]

Control Panel

FIG. 3.15

CHECK1TWO

HOME | ABOUT US | THE JUKEBOX | CONTACT | JAVAONE 2009

CONTROL PANEL / WHAT OTHER PEOPLE SEE

REGISTER | BROWSE

CHECK1TWO® EDIT ALBUMS

*Use this page to create albums from your tracks*

Available Tracks 1

| Sort Track | Track Title | Add To Album |
|---|---|---|
| Up \| Down | Manuel - 24Seconds.mp3 | Add To Selected Album |

Create A New Album

| Album Name | Number Of Disks |
|---|---|
| MyAlbum | 1 ▼ |
| | Create Album |

18

Control Panel

FIG. 3.16

CHECK1TWO

| HOME | ABOUT US | THE JUKEBOX | CONTACT | JAVAONE 2009 | | CONTROL PANEL / WHAT OTHER PEOPLE SEE | | REGISTER | BROWSE |

CHECK1TWO® EDIT ALBUMS

*Use this page to create albums from your tracks*

19

Available Tracks 1

| Sort Track | Track Title | Add To Album |
|---|---|---|
| Up \| Down | Manuel - 24Seconds.mp3 | Add To Selected Album |

MyAlbum

Sort Track ☐ Select Album [Delete Album]

Create A New Album

| Album Name | Number Of Disks | |
|---|---|---|
| | 1 ▶ | |
| | Create Album | |

Control Panel

FIG. 3.17

CHECK1TWO

HOME | ABOUT US | THE JUKEBOX | CONTACT | JAVAONE 2009

CONTROL PANEL / WHAT OTHER PEOPLE SEE | REGISTER | BROWSE

CHECK1TWO® EDIT ALBUMS

Use this page to create albums from your tracks

Available Tracks 1

| Sort Track | Track Title | Add To Album | | MyAlbum | |
|---|---|---|---|---|---|
| Up | Down | Manuel - 24Seconds.mp3 | Add To Selected Album | | | |

Sort Track
∧
∨

☑ Select Album    [Delete Album]

Manuel - 24Seconds.mp3    [Remove Track]

Create A New Album

Album Name _____    Number Of Disks [1 ▼]

[Create Album]

Control Panel

FIG. 3.18

FIG. 3.19

CHECK1TWO

| HOME | ABOUT US | THE JUKEBOX | CONTACT | JAVAONE 2009 | | REGISTER | BROWSE |

CONTROL PANEL / WHAT OTHER PEOPLE SEE

CHECK1TWO® SUBSCRIPTION INFO — 21

Basic Info

| name | value |
|---|---|
| item_name | CheckITwo 1 Year Membership |
| item_number | c12-1ym |

Payer Information

| name | value |
|---|---|
| first_name | Manuel |
| last_name | Tijerino |
| address_name | Manuel Tijerino |
| address_street | 409 Oaklane Drive Unit A |
| address_city | Hammond |
| address_state | LA |
| address_zip | 70403 |
| address_country | United States |
| address_status | unconfirmed |
| payer_email | manueltijerino@gmail.com |
| payer_id | ZAJBXGAYBBAMQ |
| payer_status | unverified |

Transaction Information

| name | value |
|---|---|
| payment_status | Completed |
| pending_reason | n/a |
| reason_code | n/a |
| payment_date | 17:28:43 May 24, 2010 PDT |
| txn_id | 1DT02210HD6868825 |

Payment Information

| name | value |
|---|---|
| payment_type | instant |

Currency And Exchange Information

| name | value |
|---|---|
| mc_gross | 3.65 |
| mc_fee | 0.41 |
| mc_currency | USD |
| settle_amount | n/a |
| settle_currency | n/a |

FIG. 3.20

Payer Information

| name | value |
|---|---|
| first_name | Manuel |
| last_name | Tijerino |
| address_name | Manuel Tijerino |
| address_street | 409 Oaklane Drive Unit A |
| address_city | Hammond |
| address_state | LA |
| address_zip | 70403 |
| address_country | United States |
| address_status | unconfirmed |
| payer_email | manueltijerino@gmail.com |
| payer_id | ZAJBXGAYBBAMQ |
| payer_status | unverified | txn_id  1DT02210HD6868825

Payment Information

| name | value |
|---|---|
| payment_type | instant |

Currency And Exchange Information

| name | value |
|---|---|
| mc_gross | 3.65 |
| mc_fee | 0.41 |
| mc_currency | USD |
| settle_amount | n/a |
| settle_currency | n/a |
| exchange_rate | n/a |

Subscription Information

| name | value |
|---|---|
| subscr_date | 17:28:36 May 24, 2010 PDT |
| mc_amount3 | 3.65 |
| recurring | 1 |
| username | pp-decoyfight |
| password | /gDiRdDBSAycA |
| subscr_id | I-FH083X7XMHYF |

FIG. 3.21

CHECK1TWO

HOME | ABOUT US | THE JUKEBOX | CONTACT | JAVAONE 2009     CONTROL PANEL / WHAT OTHER PEOPLE SEE     | REGISTER | BROWSE

CHECK1TWO® IT'S YOUR MONEY

22

Today's Earnings: $0.00

Today ▸

Title    Plays   PPP   Earnings
Manuel - 24Seconds.mp3   0    $0.20   $0.00
Total Earnings :           $0.00

Bar/Club/Venue Plays Earnings Payment Status
Total Earnings :       $0.00

Control Panel

FIG. 3.22

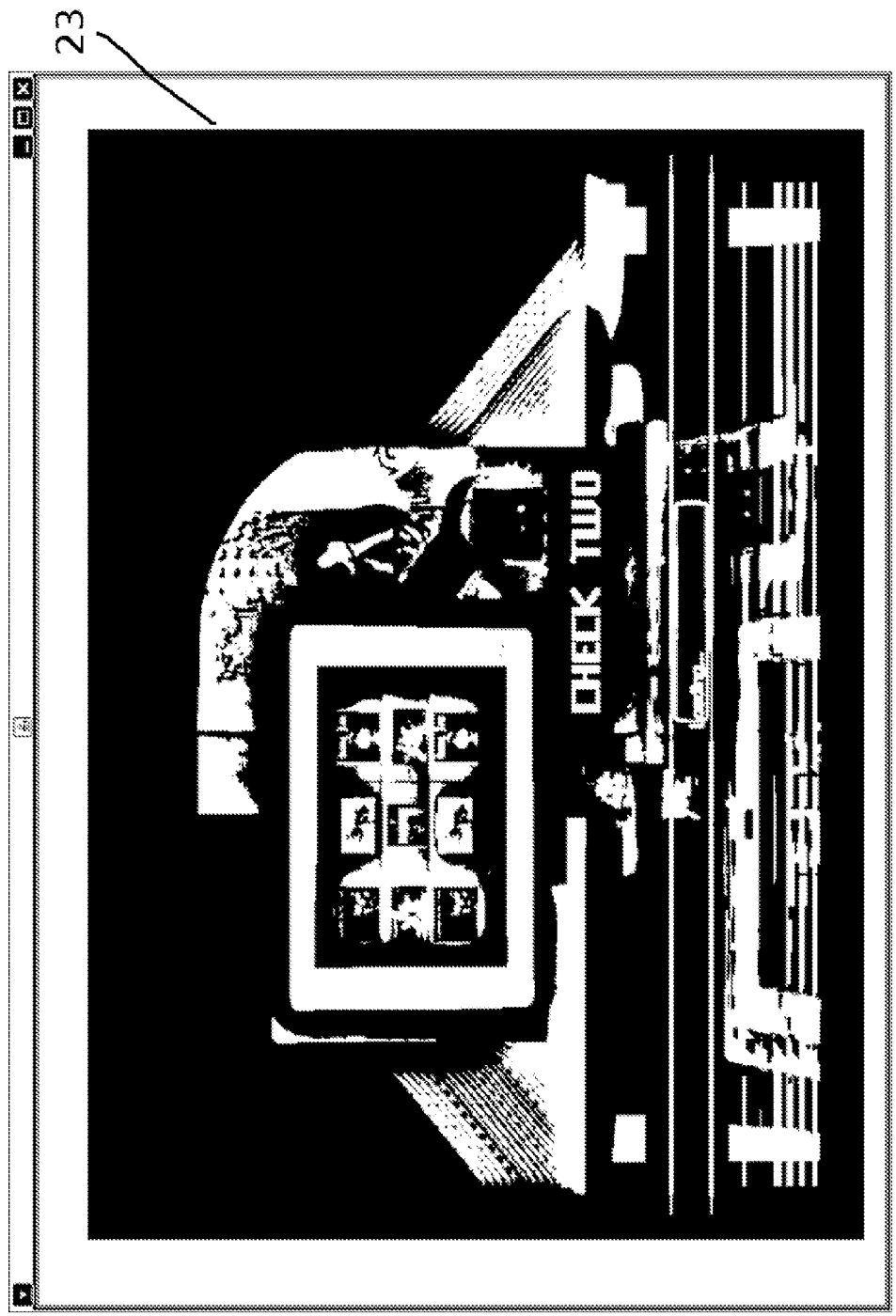
FIG. 4.1

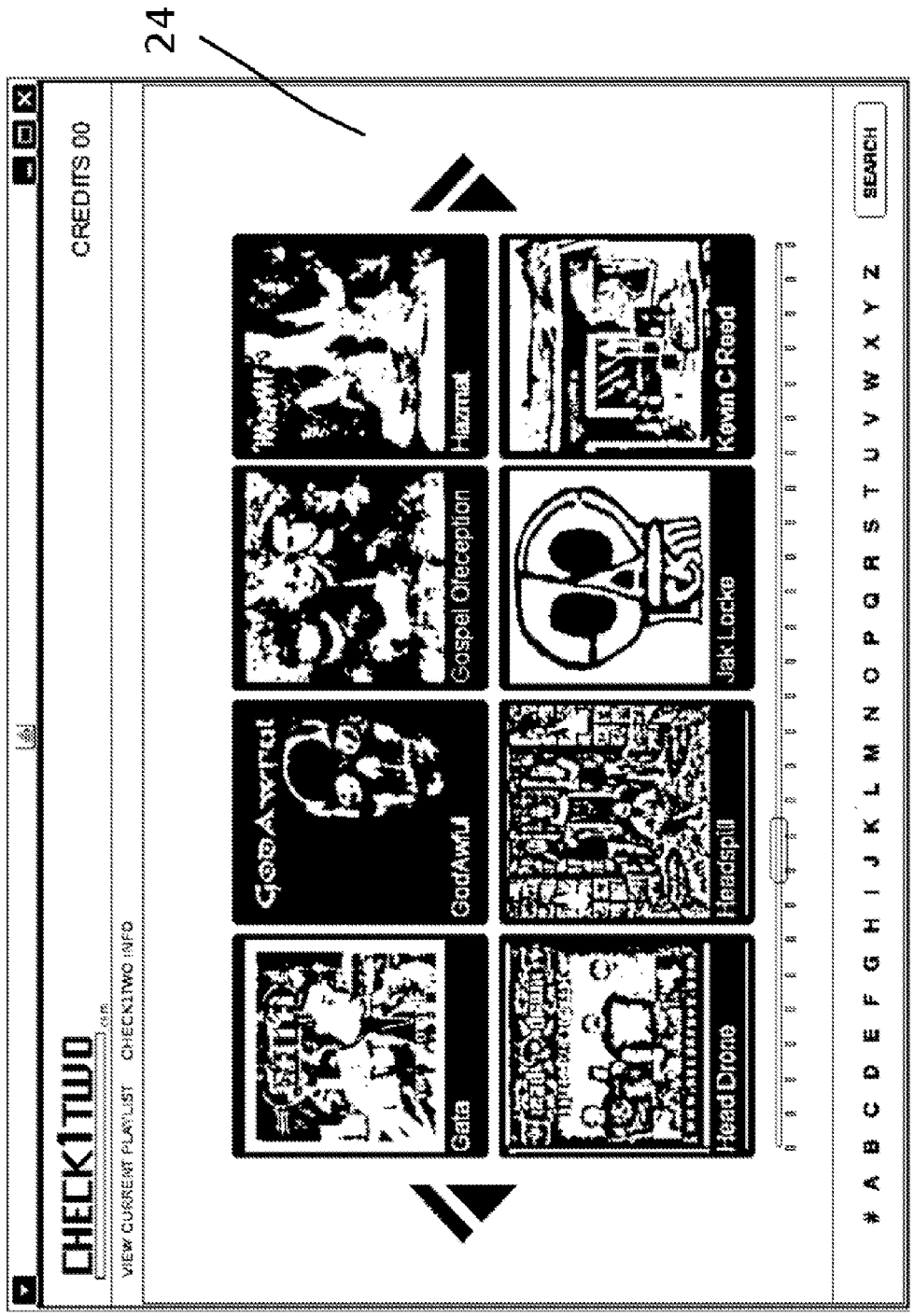
FIG. 4.2

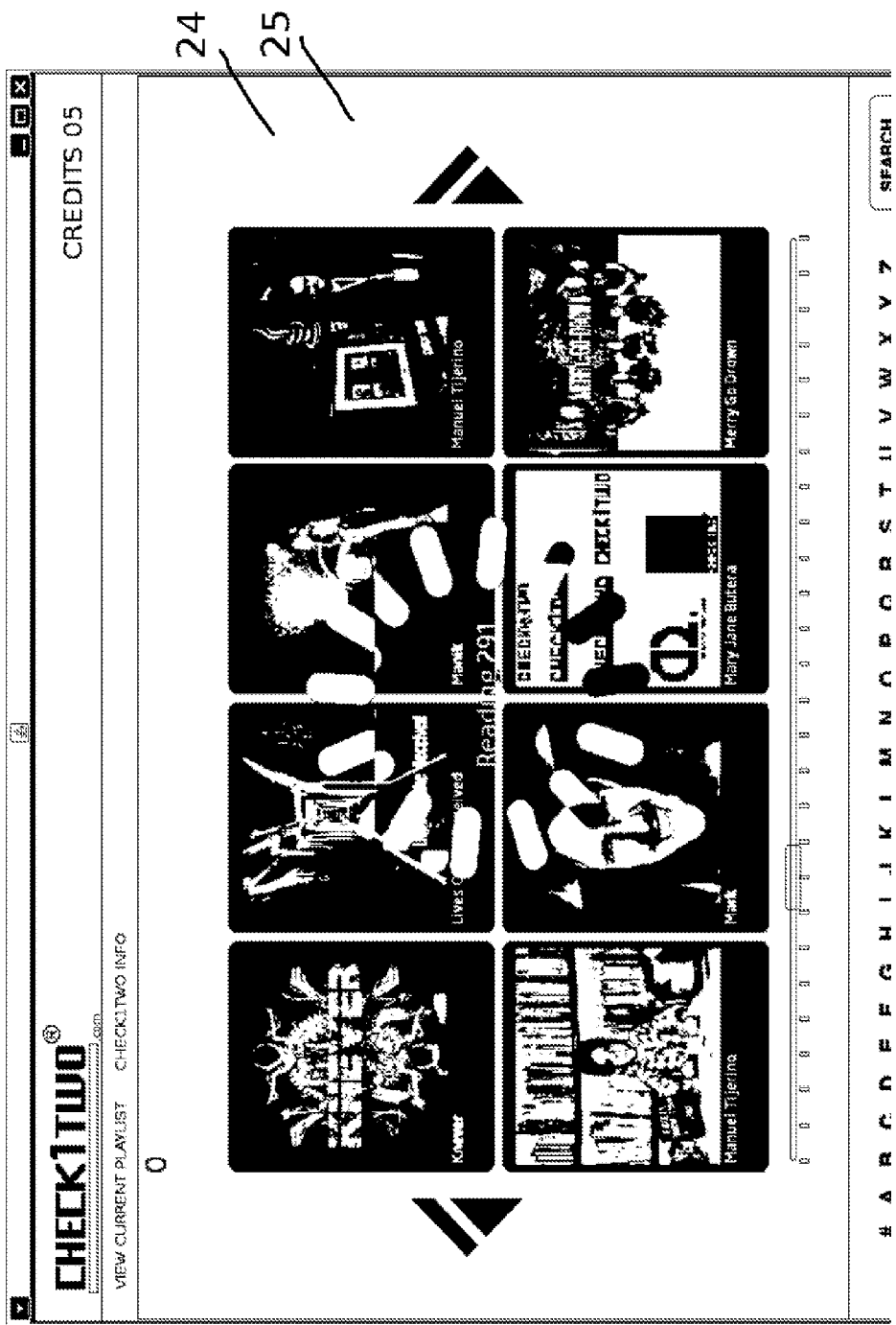
FIG. 4.3

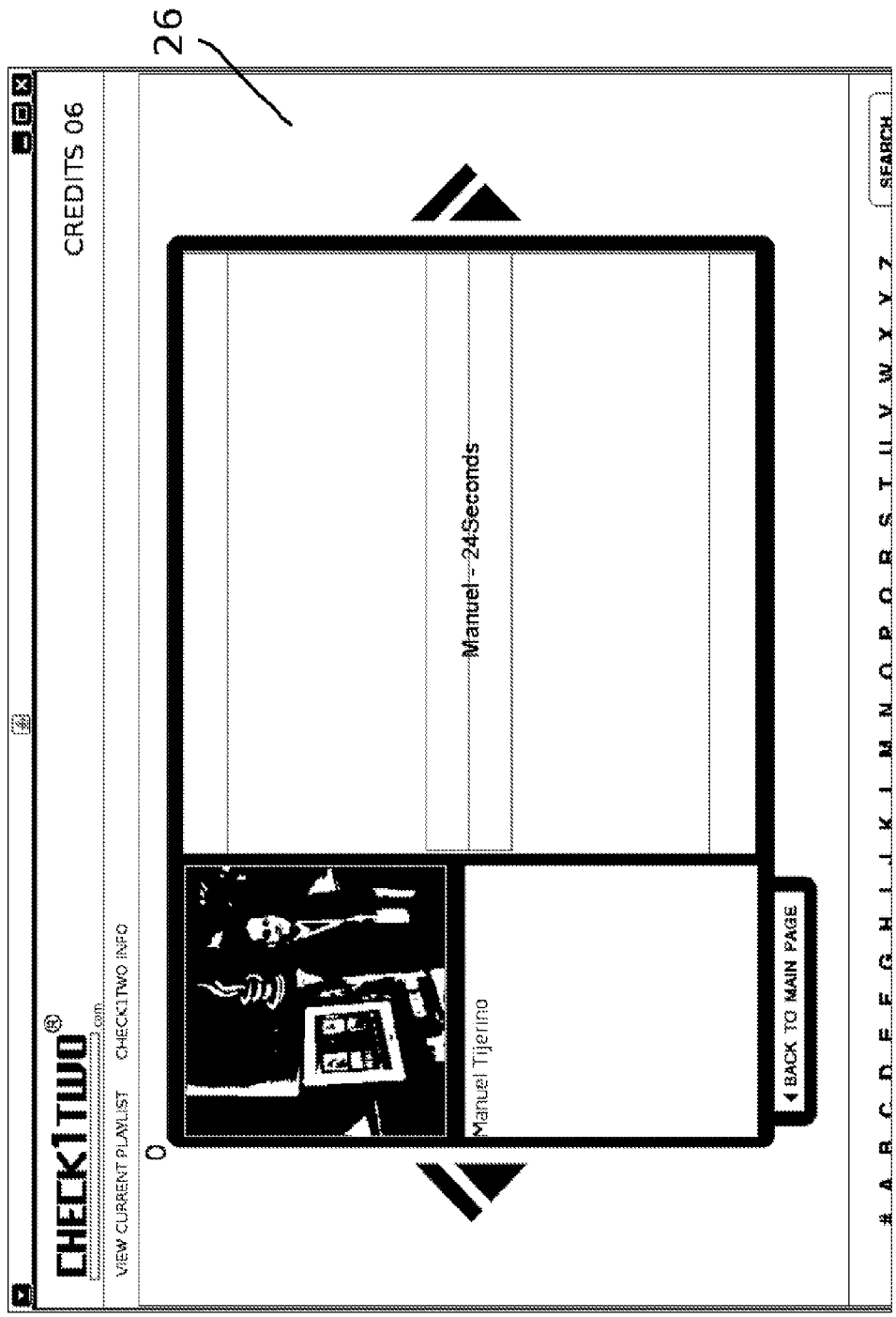
FIG. 4.4

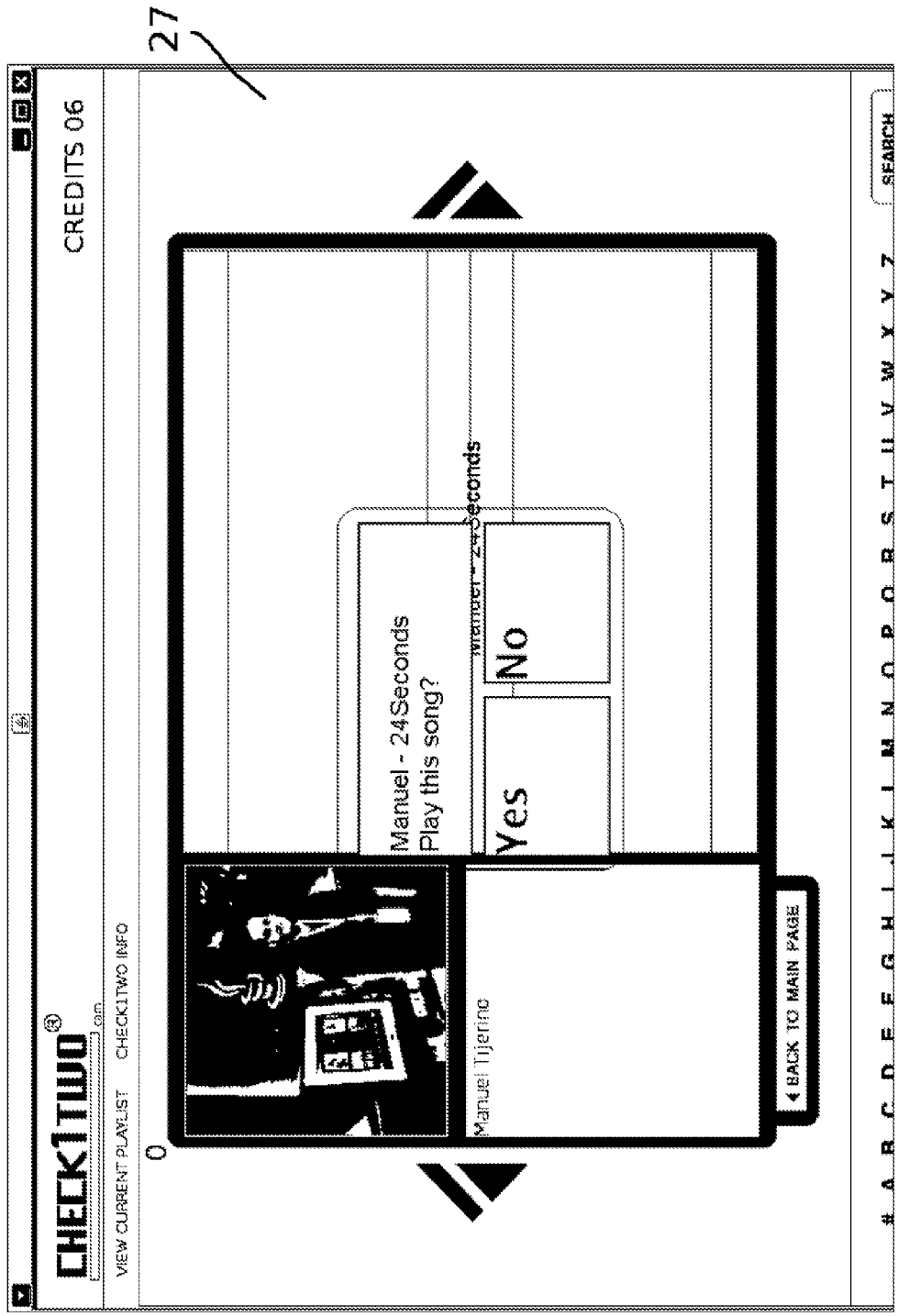
FIG. 4.5

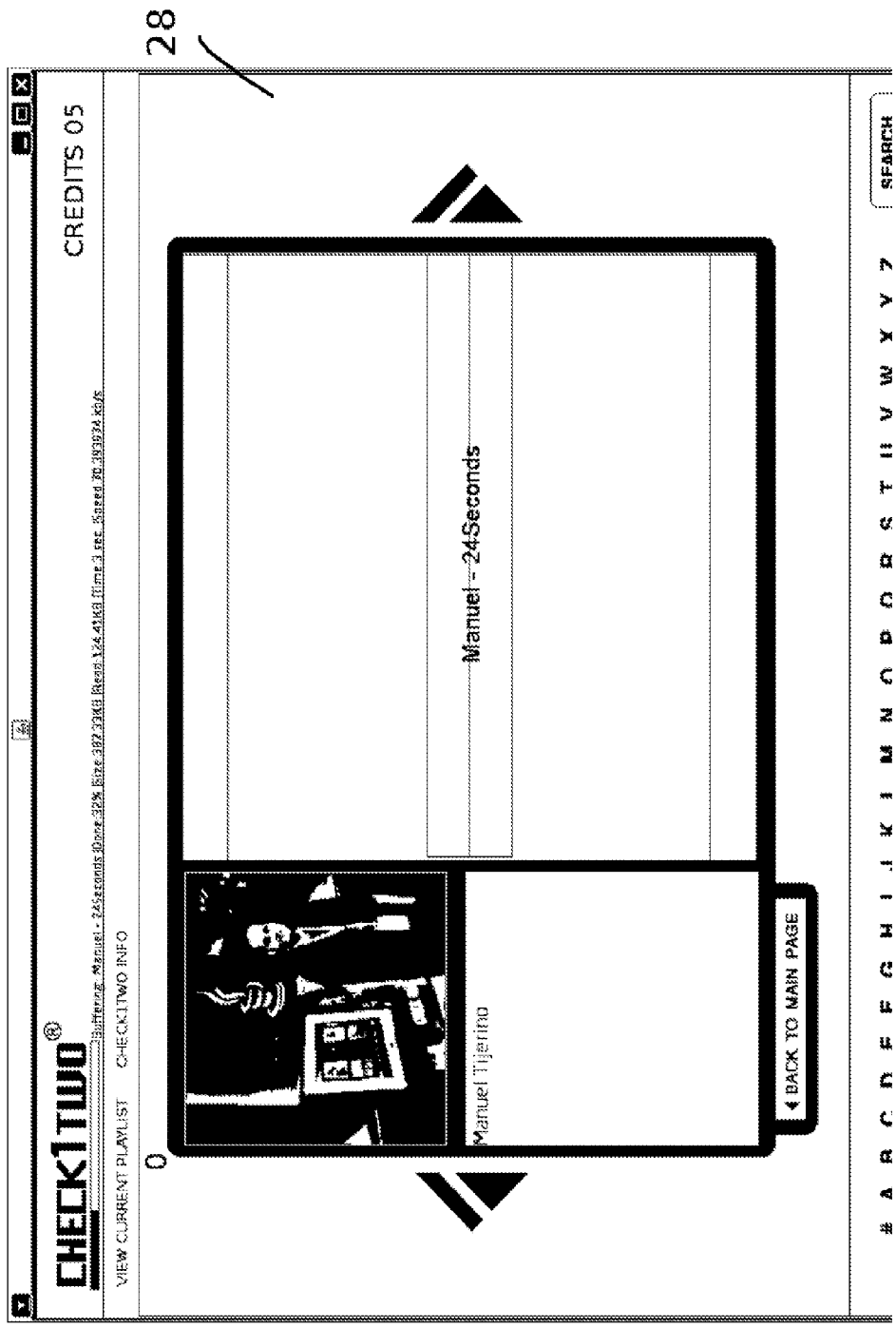
FIG. 4.6

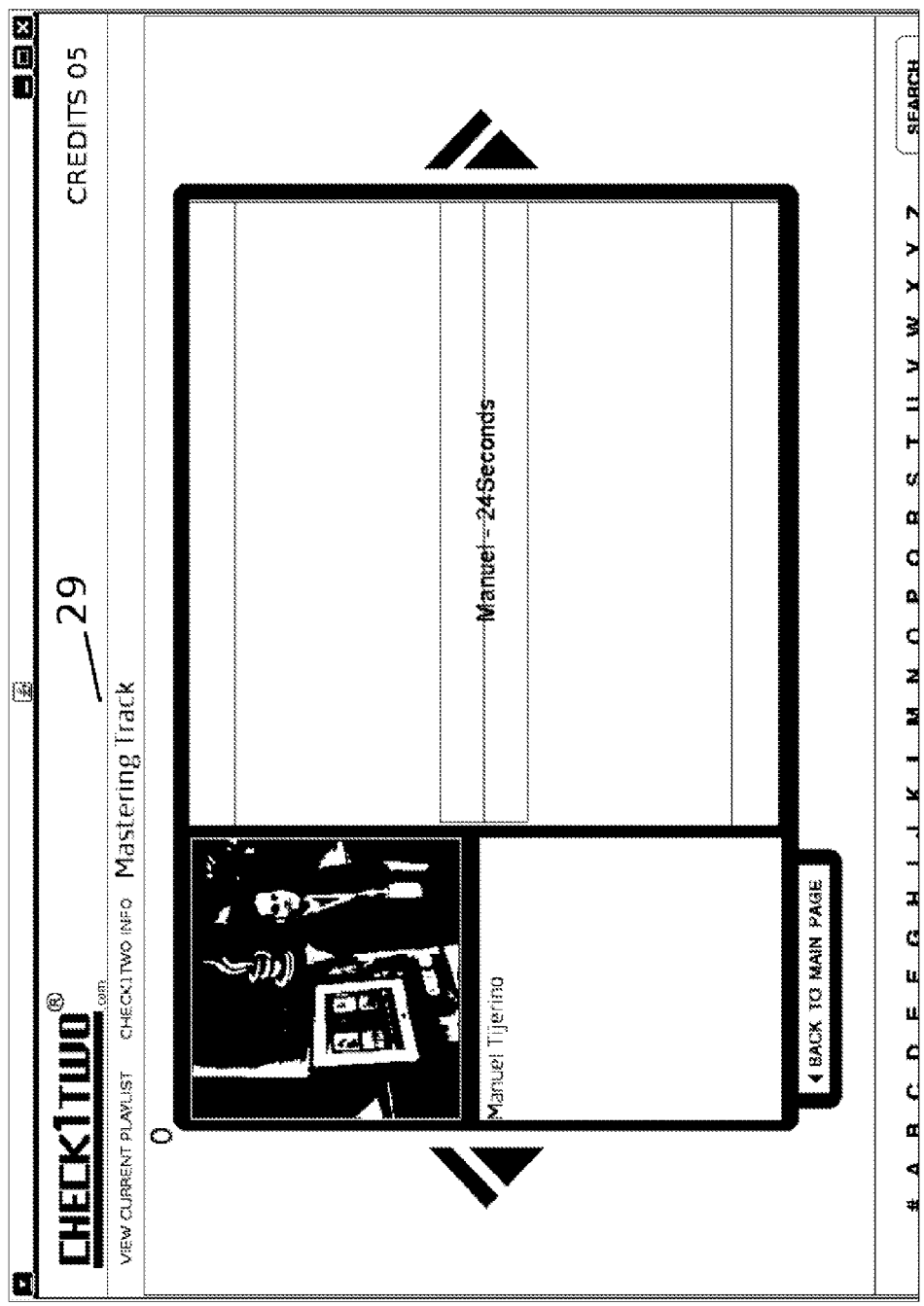
FIG. 4.7

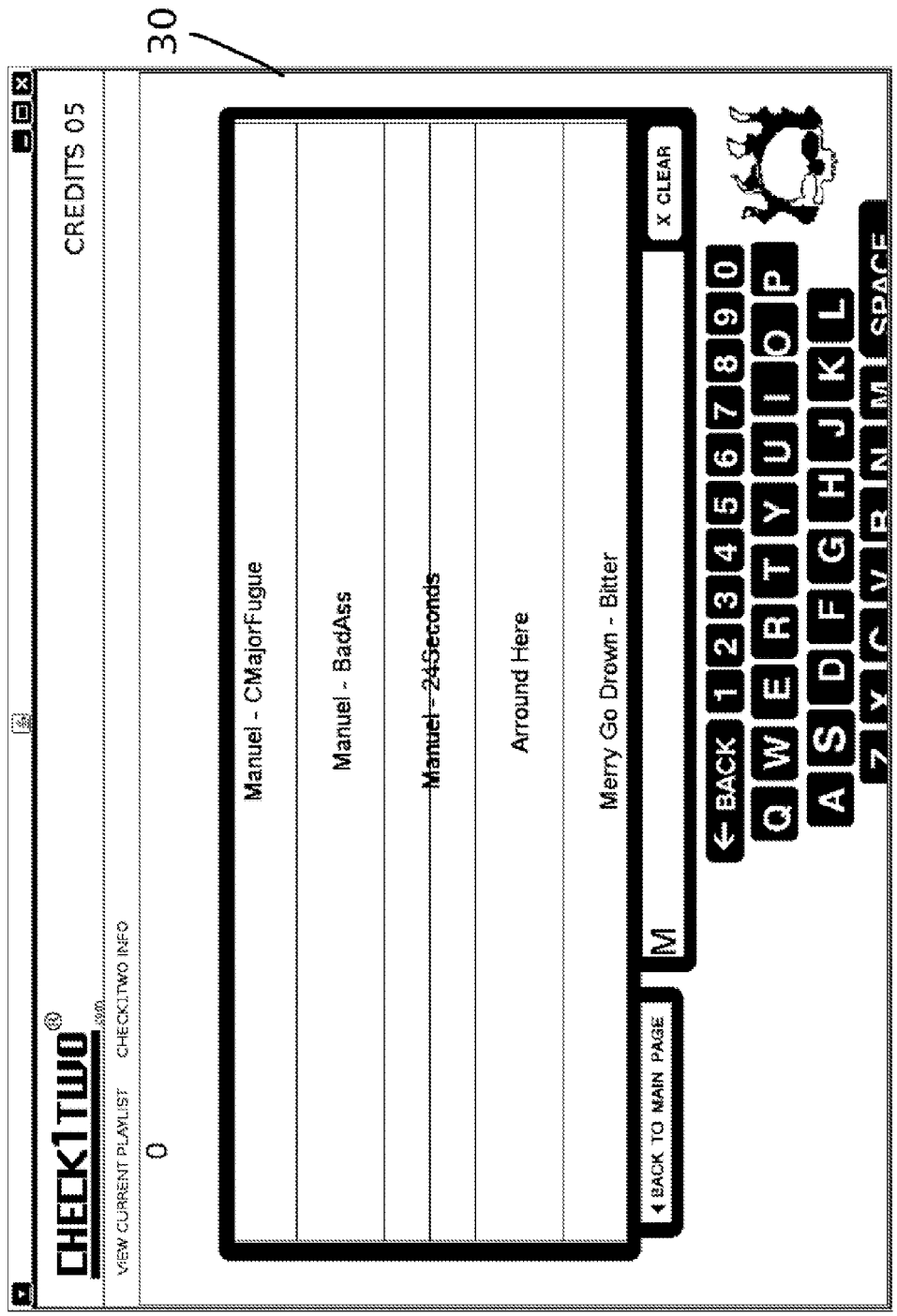
FIG. 4.8

FIG. 4.9

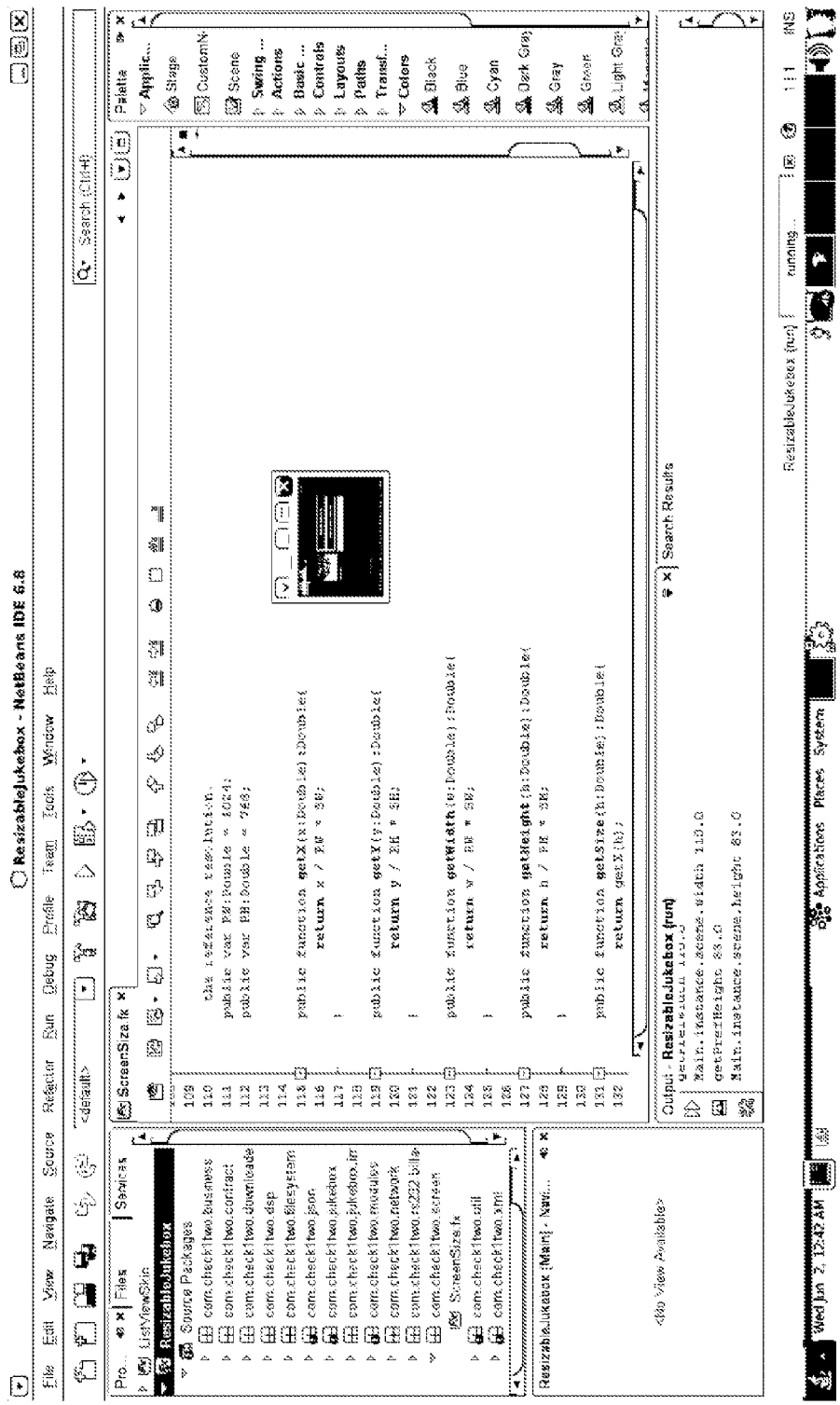
FIG. 4.10

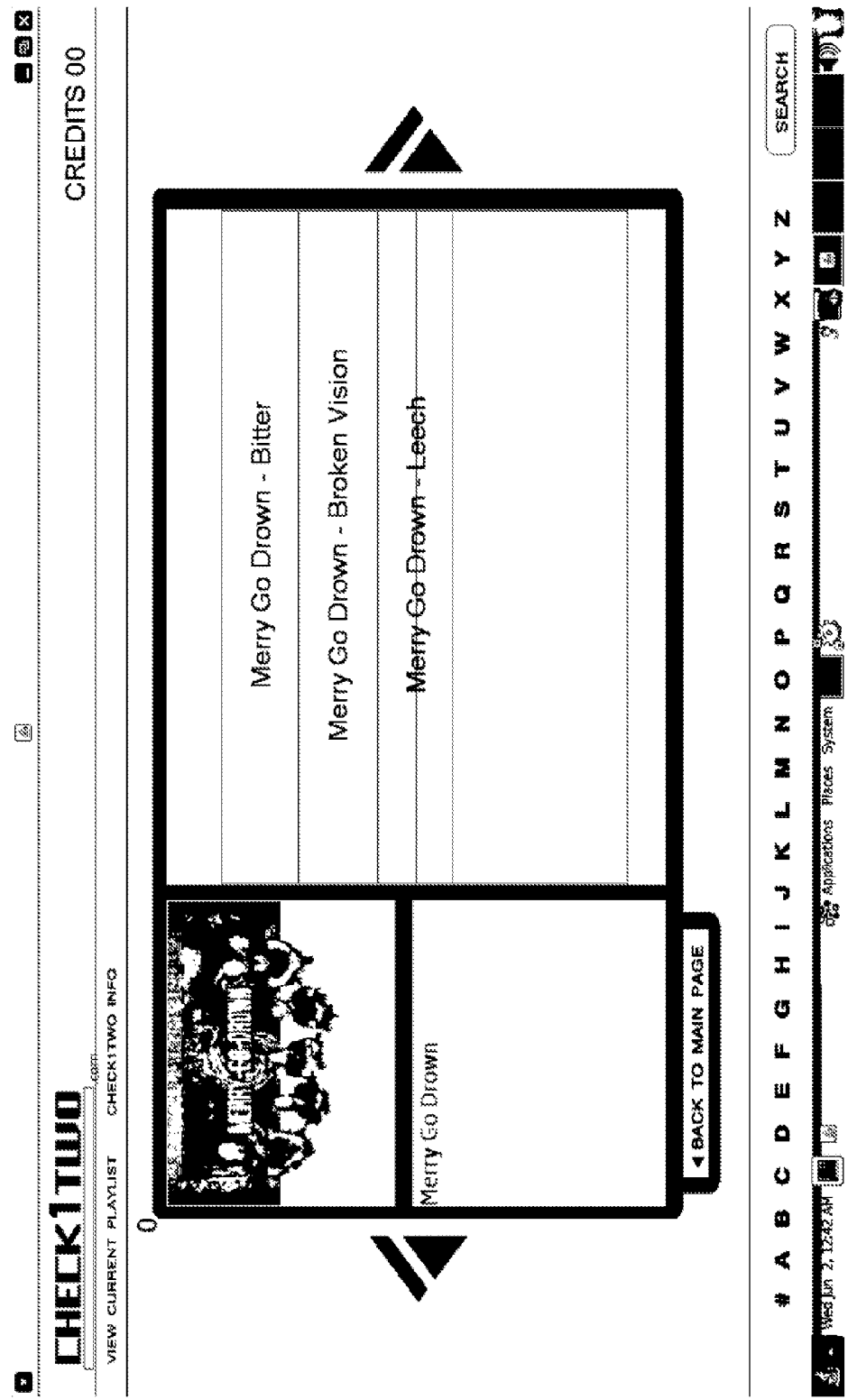
FIG. 4.11

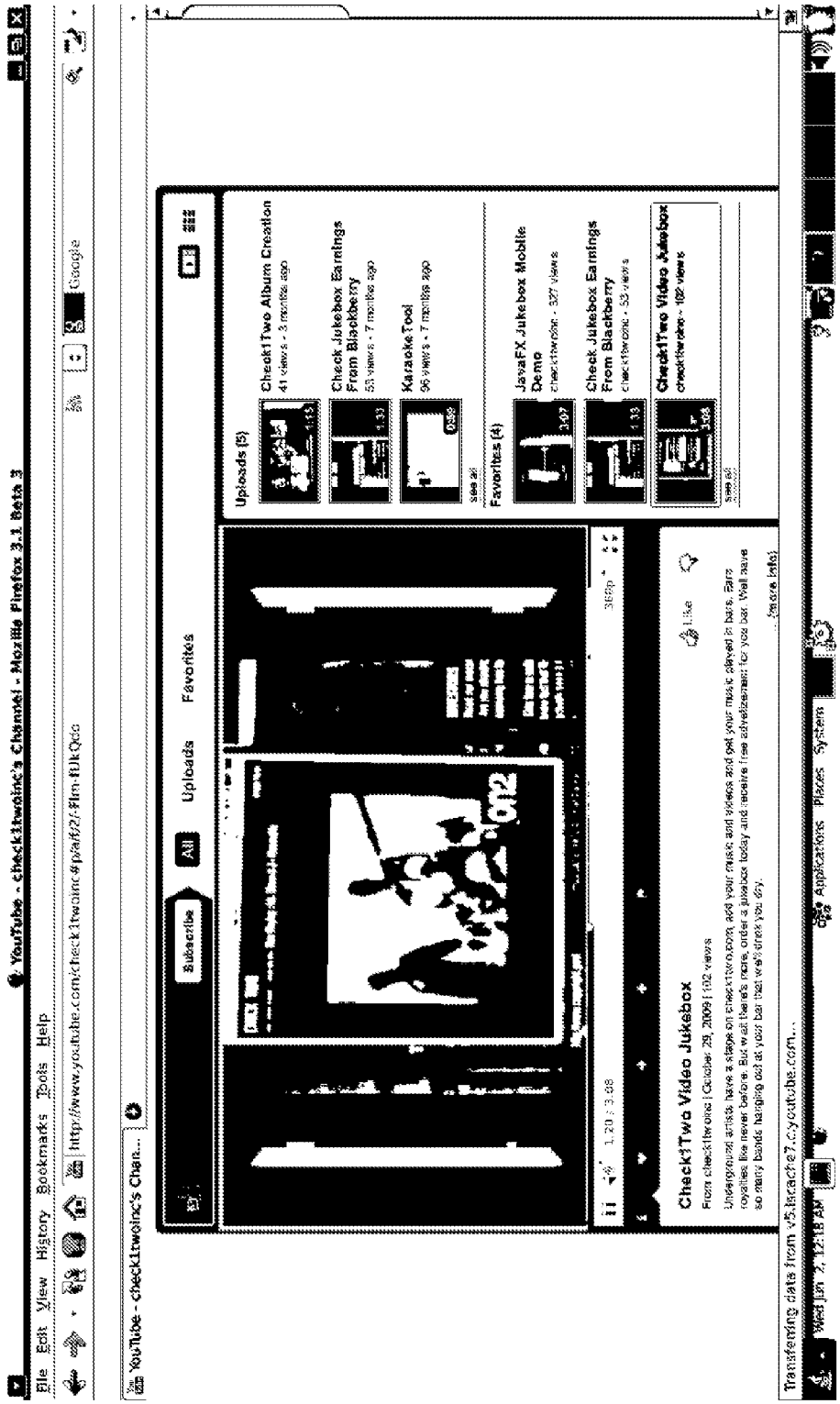
FIG. 4.12

| Your Venue Info. | |
|---|---|
| Venue Name : | Cheap Shots |
| Contact E-Mail: | cheapshots@check1two.com |
| LogIn Password : | ************ |
| Venue's Number : | 504-361-4431 |
| Venue's Website Url : | http://mybaraddress.com |
| Street Address : | 1101 Bermah Hwy |
| City : | |
| State : | |
| Prefix : | |
| Zip : | 70453 |
| Bussiness Hours : | Mon - Sun 5pm - Till |
| | Send   Reset |

FIG. 5.1

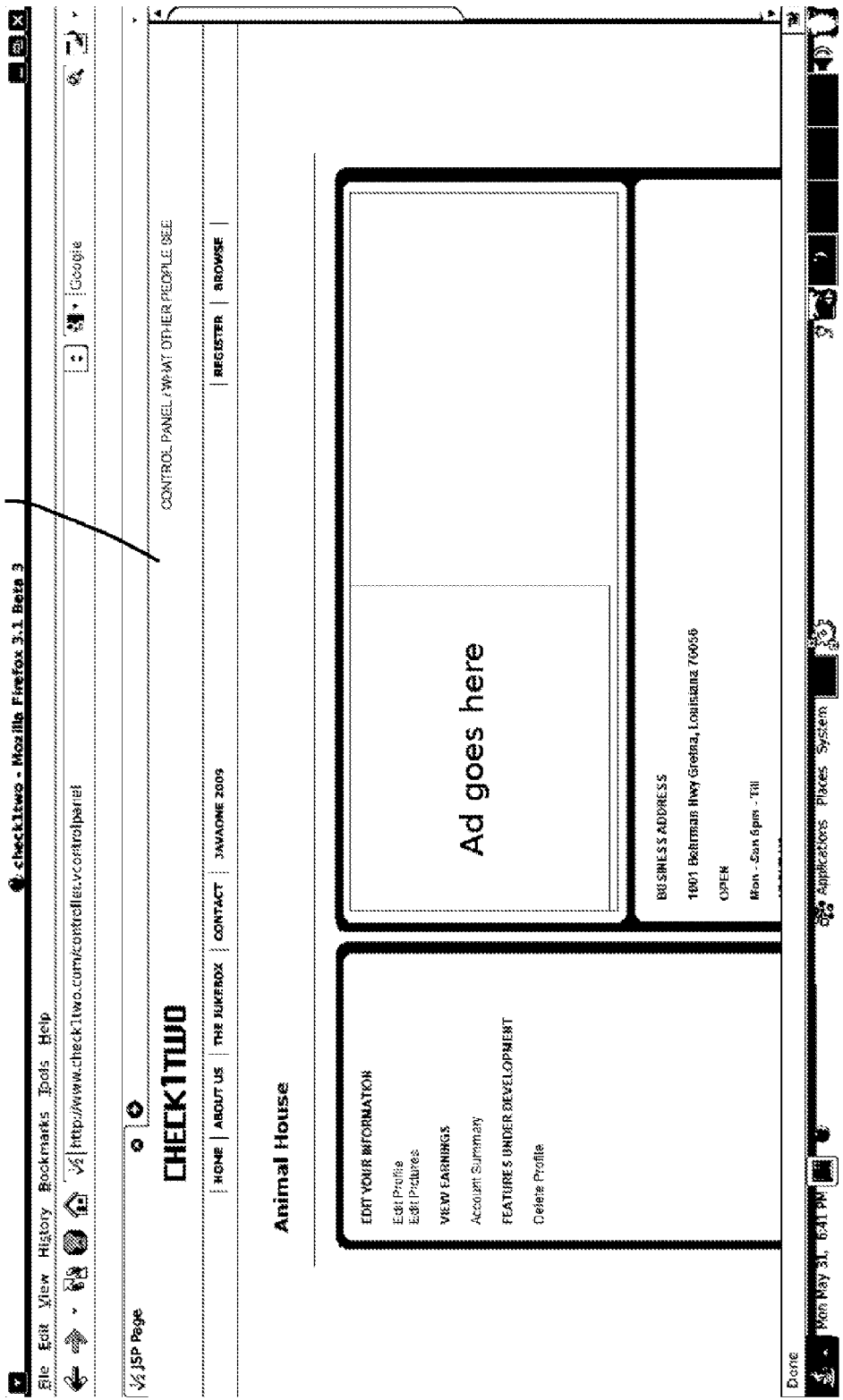
FIG. 5.2

FIG. 5.3

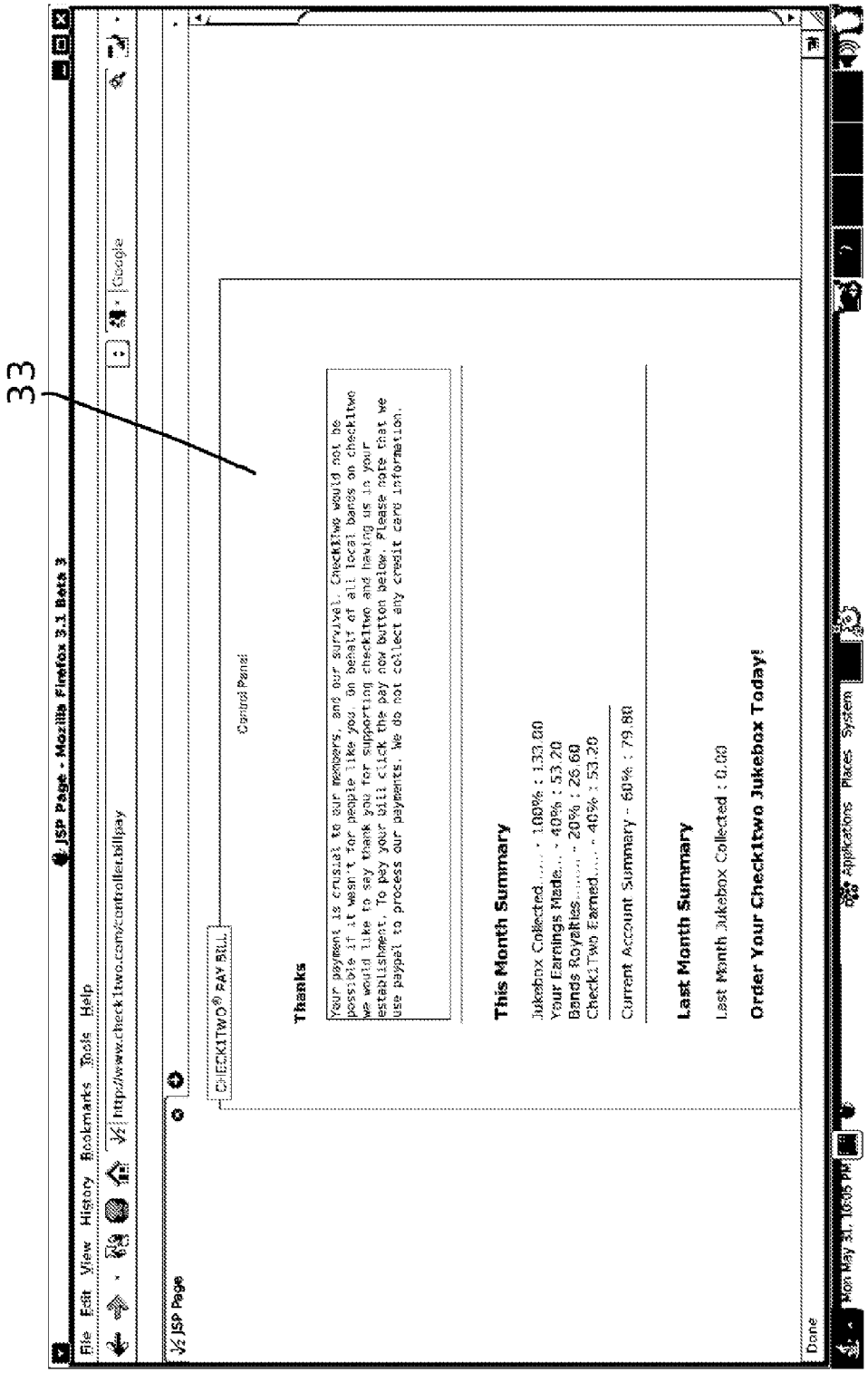
FIG. 5.4

FIG. 5.5

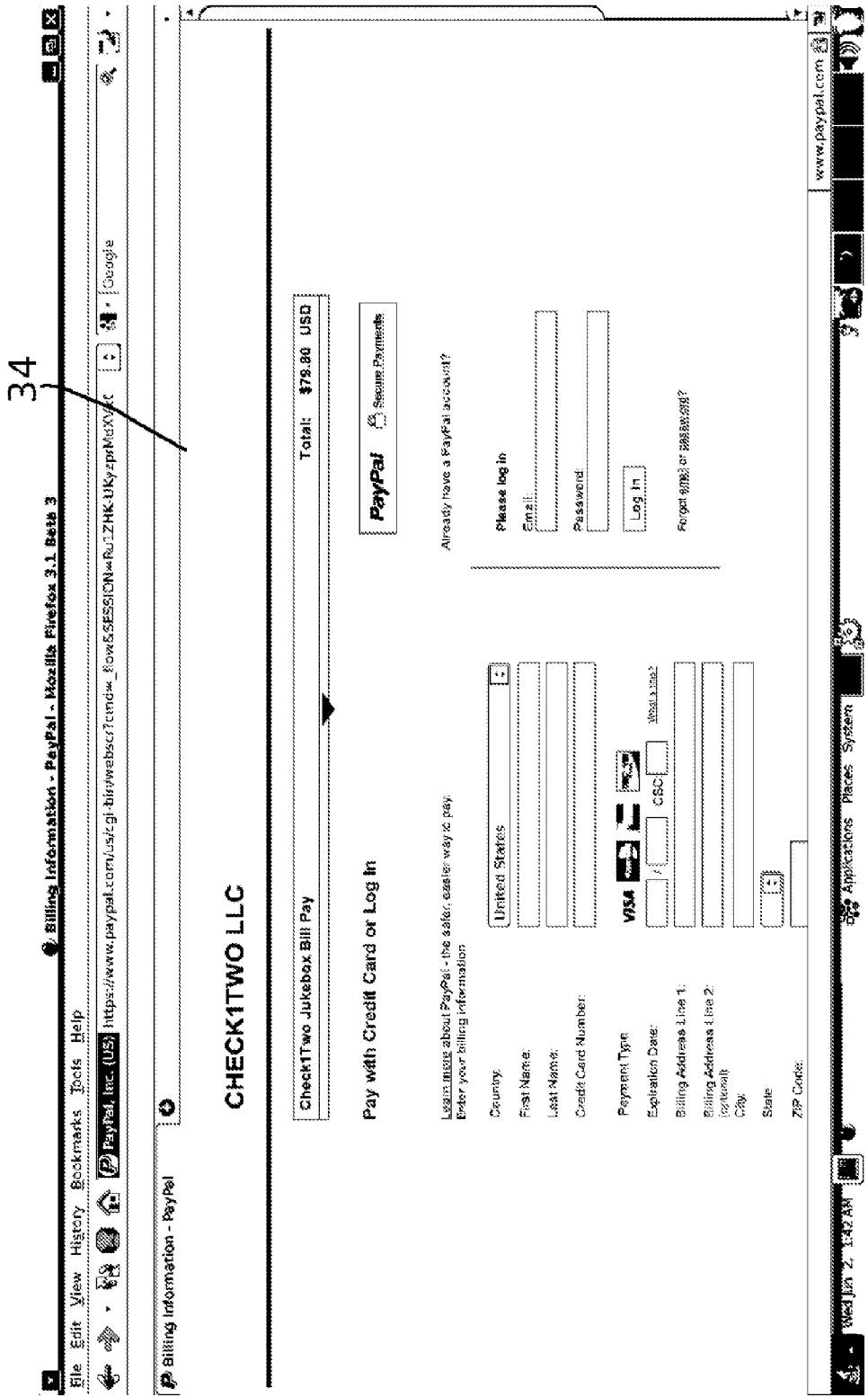
FIG. 5.6

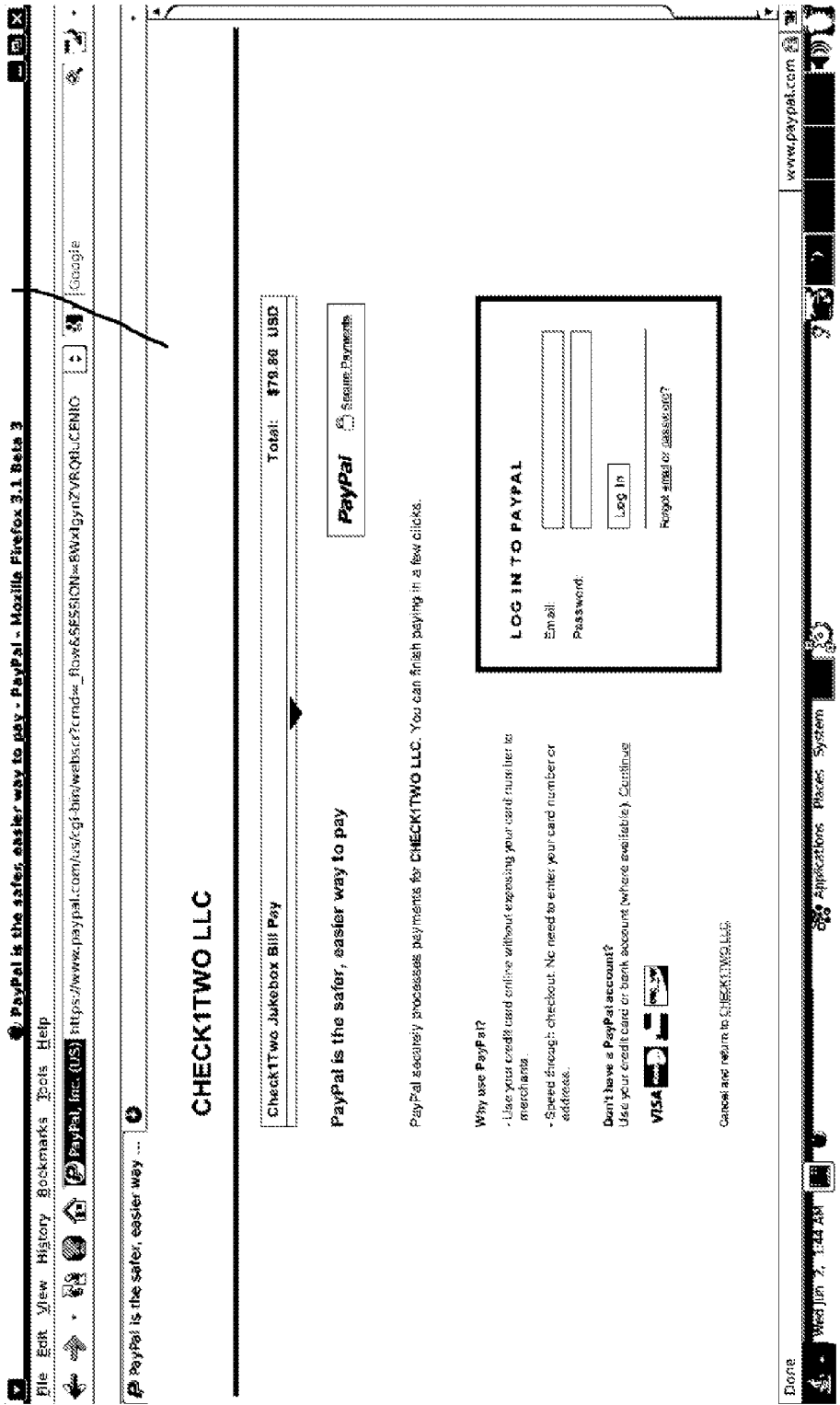
FIG. 5.7

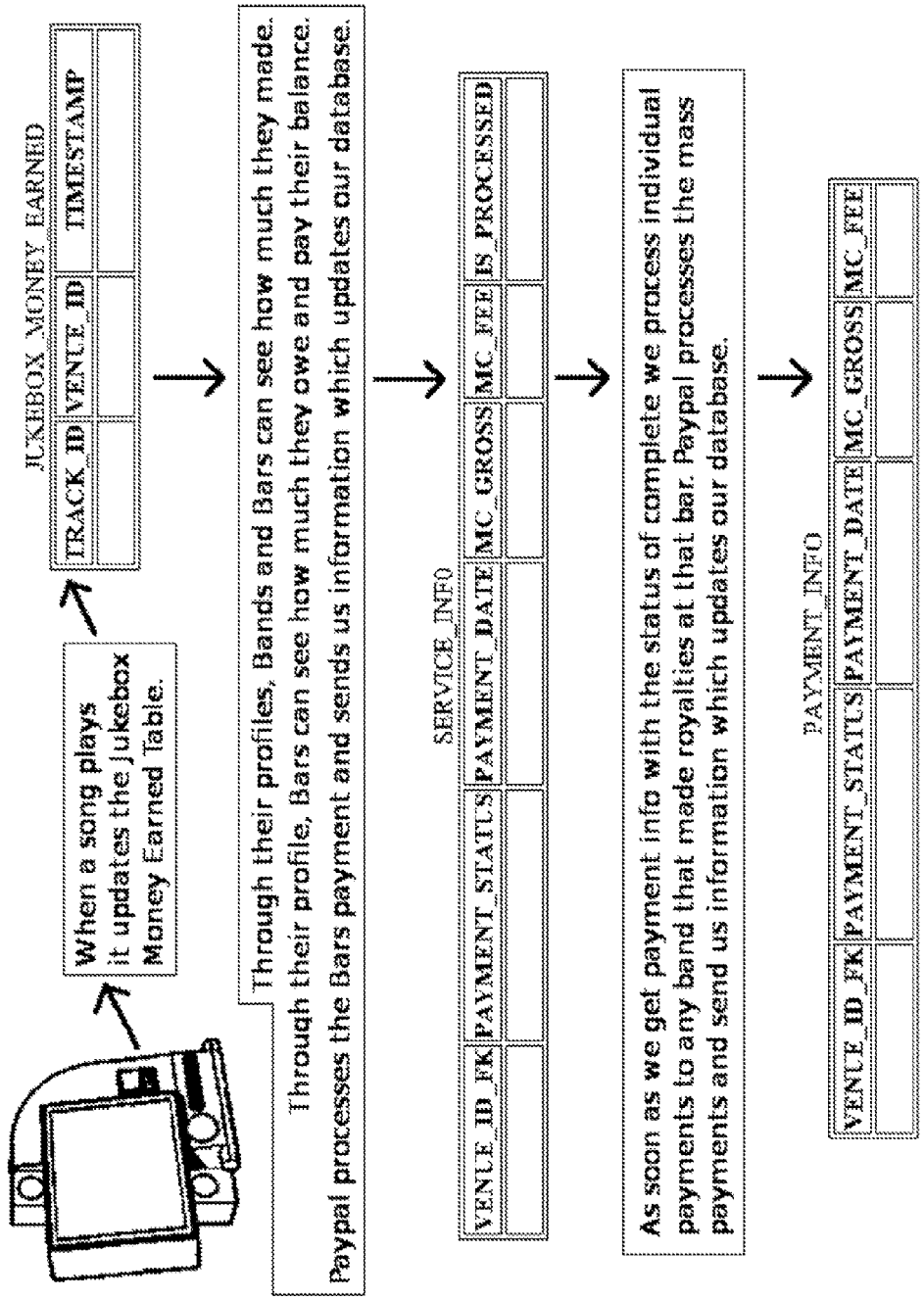
FIG. 5.8

USER DEFINED INTERNET JUKEBOX KIOSKS SET TOP BOX

BACKGROUND OF THE INVENTION

This invention relates to systems and methods for exposing local artists to the masses.

DESCRIPTION OF THE RELATED ART

Making music takes a lot of time, dedication and money. The people lucky enough to have a band still have to work hard at playing shows and exposing themselves in a way that will counter the heavy cost of equipment and practice room rent. Current internet jukeboxes serve media in digital format, therefore artists have to pay big bucks to get a digital record and still so few get air play. Before the invention of the internet jukebox, an artist had to know someone to get their cd's into the jukebox. Now with the great technological advances of the internet and internet jukeboxes artists still have to audition, submit, and practically beg the companies to put their music in their systems. Some companies will not even consider you unless you have an existing record deal. If your music is not mainstream you can forget about getting it played on any jukebox.

BRIEF SUMMARY OF THE INVENTION

As a programmer, musician, and sole creator of a website, I have noticed, the struggle faced by many local artists and musicians in the ability of promoting their music by means of the internet jukeboxes. The present invention relates particularly to the ability of a band, artist; and/or individual musician to easily upload their media to a website that is directly linked to an internet jukebox, kiosk, and/or set top box.

Jukebox systems are widely used in establishments as means of promoting well known musicians. The not so well known musicians can use this invention to promote themselves without having the clout previously needed. Typically, the musicians will upload their media to the system which will allow them to earn fees and royalties. The novelty of the invention is the power an individual will have in promoting themselves.

This invention will put an end to the current struggle local musicians face today in getting their music played in the internet jukeboxes and create better livelihoods for individual artists and bands that may have never otherwise had a chance to be heard. As used herein, the term "jukebox" is meant to be interchangeable with the terms, "internet jukebox", "kiosks" and "set top box."

A self-service IT Web 2.0 jukebox method and system is disclosed for allowing musicians a way to get exposure and make money in public venues without having to go through any screening process to join, or any filtering process to remain, in the system. The system is tailored to provide real-time authoring by the artists in the system, real-time reporting to the artists in the system and automatic real-time payment processing to the artists in the system by the establishment where the system is located. The method and system provides artists the ability to self-promote their works in public venues without third party intervention and gives artists a more meaningful way to make money by providing a direct link to their customers. The ability to create and update content given by the method and system leads to the collaborative work of many rather than a few authors. The method and system draw together the capabilities of client and server side software, content syndication and the use of network protocols. The method and system allows customers to do more than just retrieve information published by jukebox operators. The method and system has further characteristics, such as openness, freedom and collective intelligence by the way of artist participation. As used herein the terms, server, cloud, and service are interchangeable and mean the same thing.

The present invention is directed to a computer readable storage method and system allowing any artist to upload media, where media comprises images, video and music, to a server, have that media uploaded in a system of internet jukeboxes placed in establishments for instant playback of media by paying customers, providing the system of internet jukeboxes with programming to maintain an account for the artist allowing the artist to earn fees and royalties from playback of the media and to provide for automated payment of rent, and other fees due the venue, the service provider and other licensing agencies. As used herein, the term upload comprises authorship with the ability to create, edit, update and delete and to decide what media will be made available for playback by users on internet jukeboxes.

It is an object of the present invention to provide a computer implemented method of allowing any artist to upload media, where media comprises images, video and music, to an internet jukebox, comprising the steps of: providing the artist with an interface to enroll, pay a membership fee, upload media to a server, instantly transferring the media to a system of internet jukeboxes in establishments, providing for instant availability for playback of media by customers on internet jukeboxes in a venue or establishment after uploading by the artist to the server and providing the system of internet jukeboxes with programming to maintain an account for the musician allowing the artist to earn fees and royalties from playback of the media and to provide for automated payment of rent, and other fees due the venue, the service provider and other licensing agencies.

It is a further object of the present invention to provide a computer-readable storage medium for use with a graphic display device bearing program code for instructing a computer to perform a method of allowing any artist to upload media, where media comprises images, video and music, to an internet jukebox, comprising the steps of: providing the artist with an interface to enroll, pay a membership fee, upload media to a server, instantly transferring the media to a system of internet jukeboxes in establishments, providing for instant availability for playback of media by customers on internet jukeboxes in a venue or establishment after uploading by the artist to the server and providing the system of internet jukeboxes with programming to maintain an account for the artist allowing the artist to earn fees and royalties from playback of the media and to provide for automated payment of rent, and other fees due the venue, the service provider and other licensing agencies.

As used herein, a computer readable storage device is any article of manufacture that contains data that can be read by a computer or a carrier wave signal carrying data that can be read by a computer. As used herein, an article of manufacture is considered as non-transitory and a carrier wave signal is considered as transitory. This invention provides graphic user interfaces (herein referred to as "screen pages", "pages" or "screens") for use with any mouse-type pointing device or equally effective in a touch-screen computer, totally eliminating any mouse motion.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawing and/or FIGURES.

FIG. 2.1 is a website home page.
FIG. 2.2 is a terms and conditions page.
FIG. 2.3 is a profile creation page.
FIG. 2.4 is an ids table page.
FIG. 2.5 is an ids table page continued.
FIG. 3.1 is a control panel page.
FIGS. 3.2 and 3.3 are edit profile pages
FIG. 3.4 is an edit picture page.
FIG. 3.5 is a page for selection of picture from local computer.
FIG. 3.6 is an upload image page.
FIG. 3.7 is an uploaded image page.
FIG. 3.8 is a control panel page with user's image.
FIG. 3.9 is an edit music page.
FIG. 3.10 is a page for selection of music to upload.
FIG. 3.11 is an upload music page.
FIGS. 3.12 and 3.13 are upload progress bars.
FIG. 3.14 is an uploaded music page.
FIG. 3.15 is an edit albums page
FIG. 3.16 is an entry of number of discs and album page.
FIG. 3.17 is an album creation page.
FIG. 3.18 is a page for Addition of track to album.
FIG. 3.19 is an edit cover art page.
FIG. 3.20 is a subscription information page.
FIG. 3.21 is a subscription information page continued.
FIG. 3.22 is a current earnings page.
FIG. 4.1 is a jukebox splash screen.
FIG. 4.2 is a browse page.
FIG. 4.3 is a browse page with progress indicator.
FIG. 4.4 is an artist's profile.
FIG. 4.5 is a band page.
FIG. 4.6 is a modal page.
FIG. 4.7 is a mastering track page.
FIG. 4.8 is a search page.
FIG. 4.9 is a screen shot of a screen size API.
FIG. 4.10 is a one square inch application.
FIG. 4.11 is a full screen application.
FIG. 4.12 is a video application.
FIG. 5.1 is a venue account page.
FIG. 5.2 is a venue version of control panel page.
FIG. 5.3 is an account summary page.
FIGS. 5.4 and 5.5 are account summary pages with activity
FIG. 5.6 is a venue payment page for credit card.
FIG. 5.7 is a venue payment page for payment gateway.
FIG. 5.8 is a payment schematic.

DETAILED DESCRIPTION OF THE INVENTION

Figure 1:
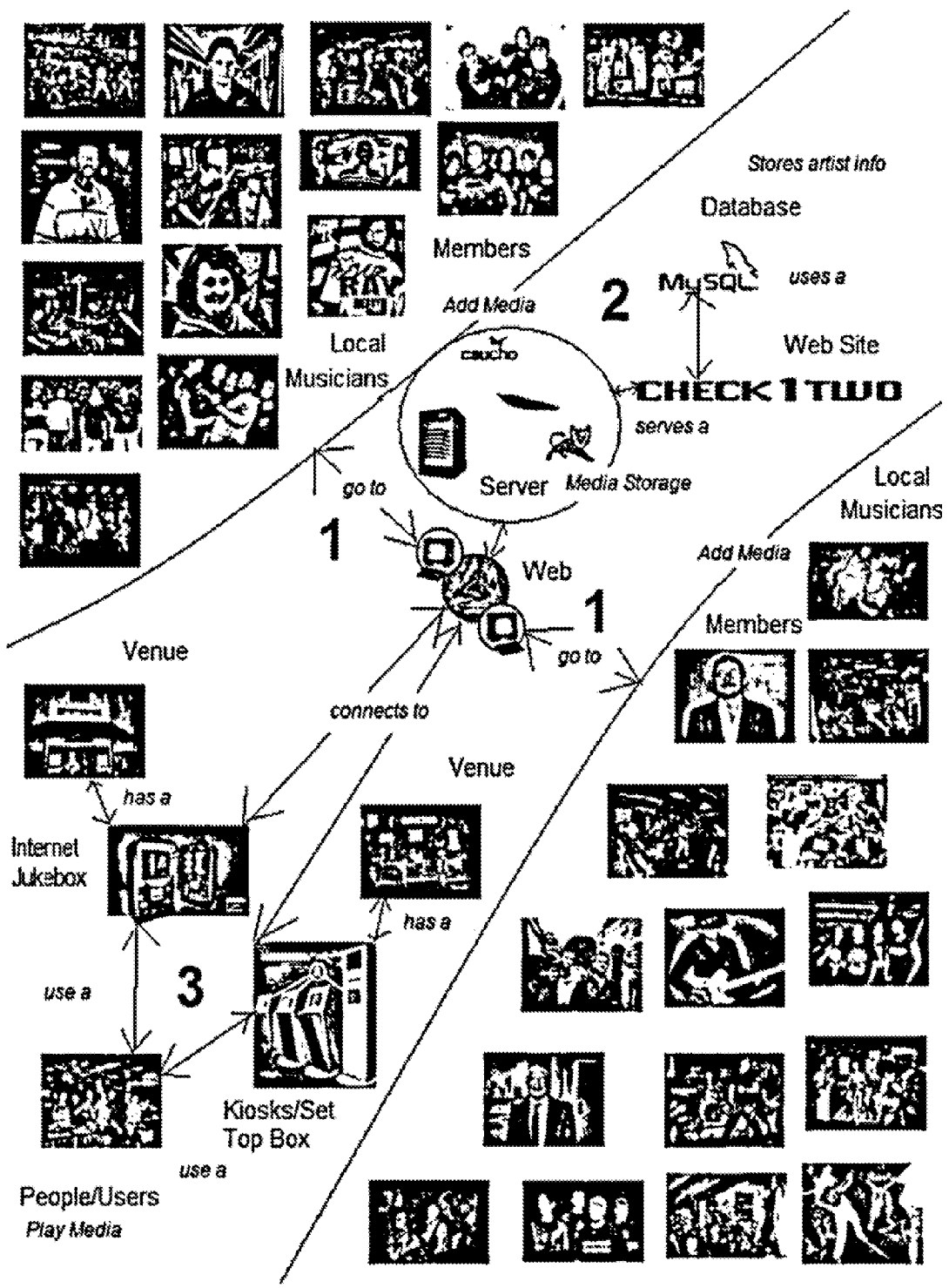
FIG. 1 is a perspective view of the entire system from start to finish.

The present invention is a unique and new way to expose local artists from any state, city or country to a world wise audience currently not implemented by internet jukeboxes. By way of overview and with reference to FIG. 1, the system of the present invention includes, the members meaning an individual musician, band, artist, etc., that add their media meaning images, music, and videos to the system, and the manner in which this media is added to the system 1. When a member gets on anything with an internet connection, such as a computer, that can upload their media, they will connect to the website or user interface provided to add their media. The back end system 2 will be composed of servers, databases and web programs that will handle storage, retrieval and updates to the members' accounts and foremost their media. The establishments that have the jukeboxes, kiosk, or set top boxes 3 will have the media available from all members in the system. This means that as soon as any member adds their media to their account it will be instantly available for playback. As used herein, the term user is interchangeable with artist.

To begin, it goes without saying that in most digital systems, there are digital user interfaces to interact with the system. In order for someone to add themselves to this system, currently they go to a web site. FIG. 2.1 shows a current site home page 4 where users go to add themselves to the system. The user will see the terms and conditions page 5 shown in FIG. 2.2. By joining users agree to the terms and conditions, and give permission to publicly perform and promote their media. When the user presses the subscribe button they are forwarded to the payment gateway page where they can pay their annual membership fee either with a major credit card, or use a payment gateway such as a PayPal® account. Once the user selects a payment method and continues they will get to review the order once more before agreeing and paying. Once the user presses the agree and pay button they will receive their login credentials such as would be generated by PayPal®. The user can write down their credentials and press return to the home page 4 or close the browser. If the user used a payment gateway account such as PayPal®, PayPal® will send will send a payment notification to a web service on the web site which will store all of the information to the system's database from the subscriber that was just created.

The user will also receive several email from the payment gateway account provider showing their transaction details including a payment successful email and a recurring payment email.

If the user pressed the return to homepage button after paying they will be redirected to the home page 4 as shown in FIG. 2.1. Upon returning the user can use their given credentials to log into the system and create their account. Once the user enters their credentials they will be forwarded to the profile creation page 6 as shown in FIG. 2.3, where they can create their profile based account. In the create profile page 6 a user will enter their artist name, email address and create a password. Users will also be able to enter their phone number, and geographic information which can be used for location based searches. Users can also enter their genre which can be used for searches, biography and web site link.

Behind the scenes once the user presses the complete sign up button, a new entry in the ids table as shown on the ids table page 7 in FIG. 2.4, is created with the corresponding type. This abstraction interface allows a single table to generate different identifiers for multiple entity objects allowing the type to define the object. In this way you're not limited to a few types of users.

Once the user presses the complete sign up button their account is created, and the user is forwarded to the Control Panel page 8 shown in FIG. 3.1. The navigation links are on the left panel, and categorized by relevance. The first link is the Edit Profile link. From the edit profile page 9 shown on FIG. 3.2 and continued on FIG. 3.3, a user can edit their profile information.

The user can click on the save button to update their profile. The user can click on the Control Panel Hyperlink to go back to the main Control Panel page 8 as shown in FIG. 3.1. The Control Panel page 8 is the home page for edits.

To add images the user can click on the Edit Pictures link which will forward him to the edit pictures page 10 as shown in FIG. 3.4. The user can click on the browse button to locate an image to select from their local computer 11 as shown in FIG. 3.5. Once the picture is found, the user can press the open button to close the file select menu as shown on the upload image page 12 in FIG. 3.6. This may vary from OS to OS. The user can now press the send button to upload a picture to their profile. The system will automatically re-side and create a thumb copy of the original as shown on the uploaded image page in FIG. 3.7. The user can add more images, delete their images by clicking the delete button, or if they add an image with the same file name, the image will be overridden. The user can click the Control Panel link to go back to the home page. Instead of the ad block you would see the user's media image as shown in FIG. 3.8.

The Edit Music link allows the user to add media by going to the edit music page 14 as shown on FIG. 3.9. The user is presented with the file upload control where they can press browse to select media to upload to the system, all as shown on the selection of music upload 11 on FIG. 3.10. Media is meant to comprise music or videos. Once a user selects their media they can press the open button to confirm their selection as shown on the uploaded music page 15 on FIG. 3.11. This will vary from OS to OS. Once the track is selected the user can press the upload button to begin the upload. Since media files take a longer time to upload the user will see an upload progress bar 16 as shown on FIGS. 3.12 and 3.13. Once the media is uploaded to the system you will see it on the uploaded music page 17 as shown in FIG. 3.14.

The system will automatically figure out aspects of the media file, such as file size, play time, and average volume. The user can add more music media, delete their files by clicking the delete button, or if they add a file with the same file name, the file will be overridden. The user can click the Control Panel link to go back to the home page 4.

Behind the scenes the file was saved to the file system on the remote server, so that you can serve the file in a normal fashion without having to store it in the database, but the files' metadata and aspects gathered were stored in the database so that you can search for it quickly. More precisely, the file was stored outside of the public _html or web folder, to prevent back links and illegal downloads. Now you have to go through a web service to get the file from the system. The web service helps to track usage and session tracking to keep compliance with ASCAP licensing for popular music. The files' metadata can be browsed by calling a restful web service. The restful web service contains Data Access Objects (dao)'s that will call the underlying metadata stored in the database. Once the service retrieves the data from the database through the dao's based on the search criteria it will encode just the metadata and return it in a commonly used format such as xml or json.

So basically you are just browsing the database through a restful web service. In the case of an image the image will be retrieved from the server in a similar fashion and shown on the program. In the case of a song or video the media will only be used when a song is requested by playback. Due to the nature of browsing data in the system the client software on the jukebox, will automatically have the new data available as soon as it is added. In this case, instantly, If it's on the server it's available in the jukebox.

Notice that the musician did not have to go through a $3^{rd}$ party to get approval to beon the system, and there is no need for an embedded database, caching, or even a hard drive on the client jukebox. You don't even need a Graphical Operating System since the jukebox software can run on top of the kernel. You can even network boot.

From the Control Panel 8 as shown in FIG. 3.8, the user can create albums from their tracks by clicking on the Edit Albums link. From the Edit Albums Page 18 as shown on FIG. 3.15, a user can create Virtual Albums and associate their media with those albums. The user can select the number of disks and enter their album name as shown in FIG. 3.16. Once the user presses the Create Album button their album will be created as shown on the create album page 19 in FIG. 3.17. A user can then select the album and click on the Add To Selected Album link to add their track to the album as shown on FIG. 3.18.

It should be noted that with the concept of Virtual Albums all we're doing is creating associations. The track can be deleted from the album or the album can be deleted but the track will still exist. An association so that you can have multiple albums with the same track in case you have a greatest hits album and want to use the same track for multiple albums.

A music video can also be associated with an album. Any media not associated with albums will not be shown in the jukebox 3 unless there are no albums created.

As a more detailed explanation: if you have an account created and do not have media then you will not be shown on the jukebox. 3. So in other words, anyone can create an account, but only those with media in their account will be shown on the jukebox 3. Adding media to your profile will make your profile available on the jukebox 3. Media activates your profile on the jukebox 3. For those who have media on their profile by default their profile picture will show in the jukebox. For the user that has media in their profile and no albums created, all of their media will be available on the jukebox. This feature is for the musician that can't make up their mind or has not decided yet what to name their album, or what cover art to use, or just simply does not want to create albums and just add tracks. A user can be on a jukebox 3 without creating an album. Once the user creates an album then only the track in the album will be shown. So for example, if a user has 20 songs uploaded and an 8 song album only their 8 songs album will show on the jukebox. This simple mechanism allows musicians a way to only feature what they want to feature.

A user can go back to the Control Panel 8 and also add Cover Art to their album by clicking on the Edit Cover Art link. In the Edit Cover Art page 20 shown in FIG. 3.19, a user will see their images and their albums created. The user can select the album and click on the Add link to make the association. The user can click on the Control Panel link to return to the home page 4.

Notice that the edit cover art, view earnings, and delete profile is listed under features under development and the subscription information is listed under personal information. As new features are added the line structure will change.

The user can click on the Subscription Information link to see their subscription information page 21 as shown on FIG. 3.20 and continued on FIG. 3.21. This data was provided by the payment gateway provider when the user subscribed. The user can click on the Control Panel link to return to the home page 4.

From the Control Page 8 a user can click on the View Earnings link to see their current earnings page 22 as shown on FIG. 3.22. The earnings page 22 allows a user to see what they have made in real time.

The client jukebox 3 is both a client to the system and part of the system. The jukebox 3 can be presented in various ways depending on the location where it will be placed. While not limited to this configuration, a present embodiment uses an industrial panel pc touch pad on a standing console that can be fitted with a bill acceptor and a credit card reader for payment by the customer of an establishment. The jukebox 3 has three main parts, the browse page, the search page and the band info page. While the system is initializing it shows the splash screen 23 as shown in FIG. 4.1. The browse page 24 as shown in FIG. 4.2 shows artists in alphabetical order and can be traversed. While you change pages you can see a progress indicator 25 as shown in FIG. 4.3. You can select the artists profile 26 from the browse page 24 by clicking on it as shown on FIG. 4.4. You can add credits to the machine through a bill acceptor and/or a credit card reader in the case of the bar version. On the desktop version you can click on it. From the band page 27 as shown on FIG. 4.5, you select the song you want to play. A modal page 28 as shown on FIG. 4.6 will pop up and ask you if you want to confirm that you want to play the song. If you select "yes play this song", the system will buffer the track into ram.

In creating the software several ways to play music were found. One way is to play files only from the file system or hard drive in the jukebox, this would allow for a jukebox with no need to use the internet. The second way is to use caching and check to see if a song is available in the hard drive and if so play it from there, and if not download it to the hard drive and then play it, this would allow for a jukebox that can automatically update from the internet, and require less bandwidth since it caches locally, but makes you wait for the entire song to download before playing it. The third way is to stream and download at the same time using a circular byte buffer, this allows the jukebox to start playing the song right away and also save the file at the same time into the cache. The fourth way is to stream the track into ram and then play it. This would ensure that the entire song is available before playing it, and would not require ay duplication of the track since it will never store into the hard drive. All of these different options are just options that can be configured. The preferred method does not require the jukebox to have a hard drive, or a caching mechanism, and would still stay in sync in real time with the remote system. You don't even need a Graphical Operating System since the jukebox software can run on top of the kernel. You can even network boot.

Most musicians are not studio engineers but still opt to record their own music since it's more affordable so they end up with tracks that have different volumes, and some are mixed bad with spikes in the audio file. Agnostic to any method mentioned above for obtaining the audio file, the jukebox will master the artist's track using digital signal processing. First the average volume is checked using the root mean (RMS) formula. This takes into account all of the positive and negative values in the sound wave, and the average volume is analyzed. This step can also occur on the server. The RMS returns a positive value which is then negated by subtracting the RMS value from 0. This negative value is then added to the maximum peak volume of 1 which returns a positive value less than 1. With this value in memory the track begins to play while the system applies several real time digital signal processing filters to fill 16 bit 44 k audio. The system applies a gain to the left and right channels. The system then applies dynamic range compression with stereo linkage using a 4:1 ratio with a threshold of 0.8. The system finally applies a hard limiter. This is done to make the tracks all sound relatively the same volume and keeps poorly mixed tracks that would otherwise sound harsh and peak from ruining the speaker system at the venue. Development is underway to do this to video files as well. Notice that while other jukeboxes turn artists away for this exact reason, the present invention, on the other hand, helps artists by mastering their track on the fly. After the track is buffered you will see the message say mastering track as shown on the mastering track page 29 in FIG. 4.7. These are all options that can be configured.

From either the Band Page 27 or the Browse page 24, the customer can press the Search button to search for tracks by title, artist or album. From the search page 30 as shown in FIG. 4.8 the customer can also pay tracks.

There are different versions and configurations of jukeboxes 3. Some versions contain only local bands for venues that only want local artists. Other versions contain local bands, as well as licensed music for venues that want this jukebox to be their featured jukebox. Royalties are paid to the artists and to the digital rights associations on a per jukebox basis. The jukebox has the ability to run in either mode. It is just another configuration option that can be enabled or disabled even while it is running.

When looking at a popular artist with many albums the albums can be traversed from a single page by clicking on the album.

Other versions of the jukebox 3 run on cell phones

Since the jukebox software is written with JavaFX, it is OS and architecture agnostic. It runs on everything where Java® runs, even on new J2ME enabled TV sets. With the screen size api shown on FIG. 4.9, any application, in this case the jukebox, can be sized to fit any screen agnostic to the screen resolution. In FIG. 4.10 is shown an application taking up 1 inch of real estate on the screen. FIG. 4.11 shows the same application without needing to restart taking up the entire screen. Other versions contain videos as shown in FIG. 4.12, and some future versions are said to contain karaoke.

Other clients can be written with different programming languages to support other language specific devices but can still use the same underlying system. For example, objective c or flash could be used to write an iphone client. The android sdk can be used to write a client for the android phone. The system and business processes that provide the solution are separate from the languages used to implement it. A good example is the Facebook social networking site. This site provides a solution for social networking but has many different clients that use the same underlying system. Similarly, YouTube® has many different clients that use the same underlying system.

To point out the main features, notice that the jukebox updates in real time. There is no screening process to join the system. There is no filtration system to filter out music. The system is inclusive, rather than exclusive. Tracts get mastered on the fly. Artists get paid royalties every time their media plays. Artists become content authors, and control their content on the jukebox client.

When a jukebox 3 is placed in a Venue, the Venue receives an account in the system as shown on the venue account page 31 on FIG. 5.1. Once the venue account is created the venue will be able to log into the system and see a venue version of the Control Panel 32 shown on FIG. 5.2 where images can be added and info edited. The venue user can click on the account summary to see details of activity in regards to the jukebox 3 in their establishment. The accounts summary page 33 shown in FIG. 5.3 will show the venue their earnings in real time.

To better illustrate a different account with activity is shown in FIGS. 5.4 and 5.5. At any time the venue can see what the machine has earned. Earnings are shared between the artists, venues, digital rights associations and the inventor if the preferred method is used. A venue can also purchase a jukebox outright or rent-to-own which would change what their share and what the website provider would share. Currently using the preferred method where the website provider owns the machine, 20% goes towards paying royalties to the musicians and the 80% left is split 50/50 between the venue and the website provider. This is in line with the industry. In other words, this is how the other jukeboxes split the earnings. Typically the digital rights associations collect on a per year basis. Being that this is considered new digital media if the digital rights associations change the manner in which they collect, the formula for splitting money can be adjusted to make sure everyone involved get a fair share. Again the venues' cut is 40%, but they will collect 100% of the money from the machine themselves. With this method in place, there is no confusion of what the venue will get. This also solves the overhead involved in having to send someone to go into the bars to collect the money every time the bill acceptor fills up, and is in line with web 2.0 methodologies, trust the user. Since the venue collects 100% of the earnings and keeps 40%, they will pay 60% back to the provider through the system, which will trigger mass payments to the artists. At the beginning of the following month the venue will see their bill from the previous month, and have a way to pay their balance.

The illustration shown in FIG. 5.5, shows that in the previous month the jukebox collected 133 dollars so in this case the venue would pay $79.80 to settle up for the previous month. The venue user can click on the pay now button to pay their balance. They will then be forwarded to the payment gateway where they can provide payment. They can either pay with a credit card as shown on the venue credit card payment page 34 in FIG. 5.6, or they can log in and pay with their PayPal® account or similar payment gateway provider as shown on the venue payment portal gateway page 35 in FIG. 5.7.

The payment gateway can change, but currently PayPal® is used. As soon as the payment is posted the system receives an instant payment notification. As soon as the payment clears the system receives a supplemental instant payment notification stating that the payment has cleared. This notification will trigger a mass payment to the artists in the jukebox for the royalties owed to them. The artists do not need to have a PayPal® account to receive their payments, they receive electronic correspondence that prompts them to create one if they do not already have one. Transaction details are stored in the cloud based system. Every party meaning the venue, the artists, the digital rights associations, and check1two is responsible for paying their own taxes. The system will automatically enable/disable any jukeboxes for non-payment and handle charging late fees, etc. The system also automatically handles generating reports for the digital rights associations, and for the Internal Revenue Service (IRS) for tax purposes. A payment schematic is shown in FIG. 5.8.

Additionally from something as simple as two foreign keys such as track id, venue id, and a timestamp from the jukebox money earned database table a wealth of statistical information can be retrieved. From a band's perspective, a band can know how much did my track make today, yesterday, this week, last week, this month, last month, and all time, for each individual track. Bands can also know where did my song play the most? Where should I play my next show, etc? From a venue's perspective, a venue can know what songs played, in what order, how many times, what is the most popular song, how much money has the jukebox collected, what can they expect to receive, what bands are the most popular, who should I invite to play at my venue, etc.

Notice there was no 3$^{rd}$ party involved in collecting royalties from the machine, paying royalties to the venue or paying royalties to the artist, it is all automated by the self-maintained, service-oriented architecture (SOA), cloud based, open, Web 2.0 system.

I claim:

1. A computer implemented method for real time music distribution of new media tor allowing an artist to control availability of the new media for playback in public venues via a jukebox, the method comprising:

providing, by a processor, a user interface to interact with a system;

providing, by the processor, a user interface to add the user to the system;

providing, by the processor, a user interface to create an account;

providing, by the processor, a user interface to log into the system;

providing, by the processor, a user interface to add the new media to the system, wherein the new media is new if not previously stored in the system;

receiving, by the processor, the new media added to the system automatically identifying, by the processor, metadata for the new media and storing the metadata in a database;

storing, by the processor, the new media in a central storage device, wherein the storing automatically enables the new media to be requested by the jukebox for playback over the Internet by providing to a client software installed in the jukebox, access to the database storing the metadata for the new media, via an API call over the Internet;

automatically analyzing, by the processor, audio signals of the new media for determining a root mean square (RMS) value, wherein the RMS value is further mathematically manipulated for obtaining a positive RMS value less than 1;

storing, by the processor, the obtained RMS value less than 1 as metadata for the new media;

providing, by the processor, the metadata for the new media over the Internet in response to the API call for display by the jukebox receiving, by the processor, a request from the jukebox for playback of the new media associated with the displayed metadata;

in response to the request, streaming by the processor the requested new media to the jukebox for playing audio corresponding to the streamed portion of the new media;

automatically calculating, by the processor, amounts earned by an artist and a venue playing the new media; and receiving, by the processor, indication of payment of the amount earned, wherein, the audio signals of the new media are normalized by the processor or jukebox by applying gain to the signals based on the obtained positive RMS value less than 1, and wherein, the audio signals of the new media are further compressed for reducing a dynamic range of the signal based on a preset compression ratio and a preset threshold value.

2. The method of claim 1 wherein media comprises images, video and music.

3. A non transitory computer-readable media embodying program instructions for execution by a computer, the program instructions adapting the computer for real time music distribution of new media to allow an artist to control availability of the new media for playback in public venues via a jukebox, the program instructions comprising:

providing a user interface for authoring of media;

providing a user interface to add the user to the system;

providing a user interface to create an account;

providing a user interface to log into the system;

providing a user interface to add the new media to the system, wherein the new media is new if not previously stored in the system;

receiving the new media added to the system;

automatically identifying metadata for the new media and storing the metadata in a database;

storing the new media in a central storage device, wherein the storing automatically enables the new media to be requested by the jukebox for playback over the Internet by providing to a client software installed in the jukebox, access to the database storing the metadata for the new media, via an API call over the Internet;

automatically analyzing audio signals of the new media for determining a root mean square (RMS) value, wherein the RMS value is further mathematically manipulated for obtaining a positive RMS value less than 1;

storing the obtained RMS value less than 1 as metadata for the new media;

providing metadata for the new media over the Internet in response to the API call for display by the jukebox;

receiving a request from the jukebox for playback of the new media associated with the displayed metadata;

in response to the request, streaming the requested new media to the jukebox for playing audio corresponding to the streamed portion of the new media;

automatically calculating, by the processor, amounts earned by an artist and a venue playing the new media; and receiving, by the processor, indication of payment of the amount earned, wherein, the audio signals of the new media are normalized by the processor or jukebox by applying gain to the signals based on the obtained positive RMS value less than 1, and wherein, audio signals of the new media are further compressed for reducing a dynamic range of the signal based on a preset compression ratio and a preset threshold value.

4. The method of claim 1 further comprising:
invoking by the processor a data access object for interfacing with the database for retrieving the metadata from the database and providing the metadata to the jukebox.

5. The method of claim 4, wherein the processor invokes the REST protocol for retrieving and transmitting the metadata.

6. The method of claim 1, wherein the metadata includes at least one of artist name, track name, or album name.

7. The method of claim 1, wherein the metadata includes file size for a file containing the media, and play time.

8. The method of claim 1, wherein the processor automatically analyzes the uploaded media for determining an average volume of the media based on the RMS value.

9. The method of claim 8 further comprising:
storing the average volume in the central storage device.

10. The method of claim 8 further comprising:
automatically adjusting, by either the processor or the jukebox, volume of the media during playback of the media, wherein the adjusting is based on the determined average volume.

11. The method of claim 1 further comprising:
updating by the processor a table for tracking playback of the media, wherein the table identifies the media, a venue playing the media, and a timestamp identifying the playback of the media.

12. The method of claim 1 further comprising:
generating, by the processor, a virtual album; and
adding, by the processor, the media to the virtual album by creating an association between the media and the virtual album.

13. The method of claim 12 further comprising:
receiving by the processor, a second media uploaded by the user, wherein the second media is not added to the virtual album, wherein the jukebox does not display the metadata for the second media.

14. The method of claim 1, wherein the jukebox is at least one of computer device, an internet jukebox, kiosk, set-top box, or cell phone.

15. The method of claim 1, wherein information available through the jukebox is synchronized with information in the database and central storage device.

16. The method of claim 1 wherein the wide area network is the Internet.

17. The method of claim 10, wherein all media is configured to be played by the jukebox with substantially a same volume based on the adjusting during playback of each of the media.

* * * * *